(12) United States Patent
Minabe et al.

(10) Patent No.: US 7,782,732 B2
(45) Date of Patent: Aug. 24, 2010

(54) OPTICAL RECORDING METHOD, OPTICAL REPRODUCING METHOD, AND OPTICAL REPRODUCING APPARATUS

(75) Inventors: Jiro Minabe, Kanagawa (JP); Yasuhiro Ogasawara, Kanagawa (JP); Katsunori Kawano, Kanagawa (JP); Koichi Haga, Kanagawa (JP); Shin Yasuda, Kanagawa (JP); Kazuhiro Hayashi, Kanagawa (JP); Hisae Yoshizawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 792 days.

(21) Appl. No.: 11/604,342

(22) Filed: Nov. 27, 2006

(65) Prior Publication Data
US 2007/0236763 A1    Oct. 11, 2007

(30) Foreign Application Priority Data
Apr. 5, 2006    (JP) .............................. 2006-104562

(51) Int. Cl.
G11B 7/0065    (2006.01)
(52) U.S. Cl. .................................................... 369/103
(58) Field of Classification Search .................. None
See application file for complete search history.

(56) References Cited

U.S. PATENT DOCUMENTS

| | | | | |
|---|---|---|---|---|
| 6,697,316 | B2 * | 2/2004 | Burr | 369/103 |
| 2002/0015376 | A1 * | 2/2002 | Liu et al. | 369/103 |
| 2002/0145773 | A1 * | 10/2002 | Tanaka et al. | 359/7 |
| 2004/0029038 | A1 * | 2/2004 | Minabe et al. | 430/270.1 |
| 2004/0042374 | A1 * | 3/2004 | Horimai | 369/103 |
| 2004/0062178 | A1 | 4/2004 | Horimai | |
| 2004/0212859 | A1 * | 10/2004 | Tsukagoshi | 359/15 |
| 2005/0063028 | A1 | 3/2005 | Yasuda et al. | |
| 2005/0231774 | A1 | 10/2005 | Hayashi et al. | |
| 2006/0050339 | A1 | 3/2006 | Kawano et al. | |

(Continued)

FOREIGN PATENT DOCUMENTS

JP    A 2002-183975    6/2002

(Continued)

OTHER PUBLICATIONS

Oct. 5, 2009 Office Action issued in U.S. Appl. No. 11/808,711.

(Continued)

*Primary Examiner*—Wayne R Young
*Assistant Examiner*—Brian Butcher
(74) *Attorney, Agent, or Firm*—Oliff & Berridge, PLC

(57) ABSTRACT

An optical recording method includes providing an optical recording medium capable of forming both a refractive index grating and an absorption grating by light irradiation; Fourier transforming with the same lens a signal beam that represents binary digital data with a brightness image and a reference beam such that they are focused at a point outside the optical recording medium; irradiating the Fourier transformed signal beam and reference beam simultaneously onto the optical recording medium and forming a diffraction grating at the optical recording medium according to an interference fringe between the signal beam and the reference beam, or according to an interference fringe within the signal beam itself; and recording the signal beam as a hologram.

12 Claims, 11 Drawing Sheets

U.S. PATENT DOCUMENTS

| | | |
|---|---|---|
| 2007/0236763 A1 | 10/2007 | Minabe et al. |
| 2008/0151734 A1 | 6/2008 | Ogasawara et al. |
| 2008/0279061 A1 | 11/2008 | Ogasawara et al. |
| 2008/0309999 A1 | 12/2008 | Yoshikawa et al. |

FOREIGN PATENT DOCUMENTS

| | | |
|---|---|---|
| JP | A-2003-178460 | 6/2003 |
| JP | B2 3452113 | 7/2003 |
| JP | A-2004-059897 | 2/2004 |
| JP | A 2005-099176 | 4/2005 |
| JP | A 2005-122867 | 5/2005 |
| JP | A-2005-215381 | 8/2005 |
| JP | A 2005-241674 | 9/2005 |
| JP | A 2005-301038 | 10/2005 |
| JP | A 2006-078686 | 3/2006 |
| JP | A-2006-220933 | 8/2006 |
| WO | WO 2006/098455 | 9/2006 |
| WO | WO 2007/096972 | 8/2007 |

OTHER PUBLICATIONS

Jun. 15, 2010 Office Action issued in Japanese patent application No. 2006-104562 (with translation).

\* cited by examiner

Pixel for Reference Beam

Pixel for Signal Beam

Pattern of SLM

OPTICAL RECORDING METHOD, OPTICAL REPRODUCING METHOD, AND OPTICAL REPRODUCING APPARATUS

BACKGROUND

1. Technical Field

The present invention pertains to an optical recording method, an optical reproducing method, and an optical reproducing apparatus, and particularly relates to an optical recording method that uses the same lens for a Fourier transformed signal beam, which represents binary digital data with a brightness image, and a reference beam. The method simultaneously irradiates the Fourier transformed signal beam and reference beam onto an optical recording medium for recording the signal beam as a hologram. The present invention also pertains to an optical reproducing method and apparatus that reproduce the binary digital data carried by the signal beam from the optical recording medium on which the hologram is recorded by this optical recording method.

2. Related Art

With holographic data storage, the "0,1" of binary digital data is changed into a digital image (a signal beam) as a brightness image, and the signal beam is Fourier transformed by a lens and irradiated onto an optical recording medium. At the optical recording medium, the Fourier transformed image is recorded as a hologram.

For such recording, a coaxial hologram recording system which causes the signal beam and the reference beam to enter the same lens, and causes both Fourier transformed patterns to interfere with each other in the optical recording medium for recording the hologram is proposed.

SUMMARY

According to an aspect of the invention, there is provided an optical recording method, including: providing an optical recording medium capable of forming both a refractive index grating and an absorption grating by light irradiation; Fourier transforming with the same lens a signal beam that represents binary digital data with a brightness image and a reference beam such that they are focused at a point outside the optical recording medium; irradiating the Fourier transformed signal beam and reference beam simultaneously onto the optical recording medium and forming a diffraction grating at the optical recording medium according to an interference fringe between the signal beam and the reference beam, or according to an interference fringe within the signal beam itself, and recording the signal beam as a hologram.

BRIEF DESCRIPTION OF THE DRAWINGS

Embodiment of the present invention will be described in detail based on the following figures, wherein.

DETAILED DESCRIPTION

Figure 1:
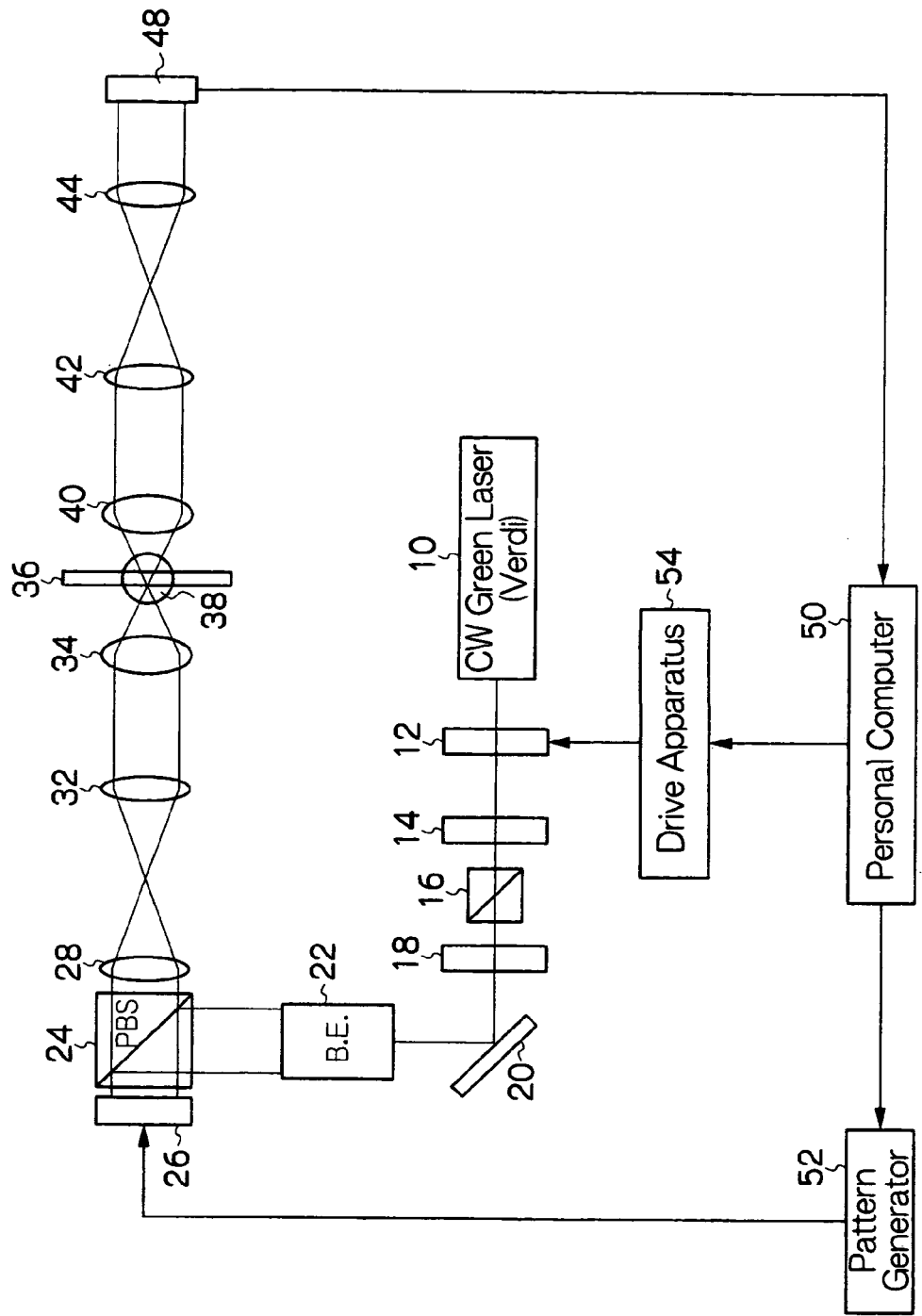
FIG. 1 is a drawing illustrating the schematic configuration of a hologram recording and reproducing apparatus pertaining to the exemplary embodiment according to an aspect of the invention.

The present invention may provide an optical recording method, an optical reproducing method, and an optical reproducing apparatus which are capable of reproducing the digital data at a high S/N ratio even when the coaxial hologram recording system is used.

The optical recording method according to an aspect of the invention may use an optical recording medium capable of forming both a refractive index grating and an absorption grating under light irradiation; Fourier transform a signal beam which represents binary digital data with a brightness image and a reference beam with the same lens such that they are focused at a point outside the optical recording medium; simultaneously irradiate the Fourier transformed signal beam and reference beam onto the optical recording medium for forming a diffraction grating according to the interference fringe between the signal beam and the reference beam, or the interference fringe between the signal beams, in the optical recording medium; and record the signal beam as a hologram.

In addition, the optical reproducing method according to an aspect of the invention may irradiate, onto the optical recording medium on which the signal beam is recorded as a hologram by the above-mentioned optical recording method, the Fourier transformed reference beam as the reading-out light for generating a diffracted light represented by an inverted image of the signal beam from the diffraction grating formed in the optical recording medium; detect the light intensity of the diffracted light for each pixel for generating image data for the inverted image; and inversion process the image data such that the binary code is inverted, for reproducing the binary digital data carried by the signal beam.

In addition, the optical reproducing apparatus according to an aspect of the invention may include a reading-out optical system which irradiates, as the reading-out light the Fourier transformed reference beam onto the optical recording medium at which the signal beam has been recorded as a hologram by the above-mentioned optical recording method generating diffracted light representing an inverted image of the signal beam from the diffraction grating formed in the optical recording medium; a photodetector that detects for each pixel the light intensity of the diffracted light generated by the reading-out optical system, generating image data for the inverted image; and an inversion processing unit, inversion processing the image data such that the binary code is inverted, reproducing the binary digital data carried by the signal beam.

In the present invention, an optical recording medium capable of forming both a refractive index grating and an absorption grating under light irradiation is used, and the signal beam and the reference beam which have been Fourier transformed such that they are focused at a point outside the optical recording medium are simultaneously irradiated, whereby a diffraction grating according to the interference fringe between the signal beam and the reference beam, or the interference fringe between the signal beams, can be formed in the optical recording medium for recording the signal beam as a hologram.

At the time of reproduction, by irradiating the Fourier transformed reference beam in the same manner as at the time of recording, as the reading-out light onto the optical recording medium on which the signal beam is recorded as a hologram, a diffracted light represented by an inverted image of the signal beam is generated from the diffraction grating formed in the optical recording medium. By detecting the light intensity of this diffracted light for each pixel, the image data for the inverted image is generated. And, by inversion processing the image data such that the binary code is inverted, the binary digital data carried by the signal beam can be reproduced at a high S/N.

Hereinbelow, with reference to the drawings, an exemplary embodiment according to an aspect of the invention will be described in detail.

(Coaxial Hologram Recording System)

FIG. 1 is a drawing illustrating the schematic configuration of a hologram recording and reproducing apparatus pertaining to the exemplary embodiment according to an aspect of the invention. With this hologram recording and reproducing apparatus, a hologram is recorded by the coaxial recording system. In other words, a signal beam and a reference beam are Fourier transformed by the same lens, and are simultaneously irradiated onto an optical recording medium for recording the hologram.

In this hologram recording and reproducing apparatus, a light source 10 which continuously oscillates laser light, which is a coherent light, is provided. On the laser light irradiation side of the light source 10, a shutter 12 for blocking out the laser light is disposed insertably into and retractably from the optical path. The shutter 12 is driven by a drive apparatus 54 on the basis of a control signal from a personal computer 50.

On the light transmission side of the shutter 12, a ½ wavelength plate 14, a polarized light beam splitter 16, and a ½ wavelength plate 18 are disposed in this order. On the light transmission side of the ½ wavelength plate 18, a mirror 20 for changing the optical path of the laser light is disposed. On the light reflection side of the mirror 20, a beam expander 22 for collimating the introduced beam into a beam having a large diameter is disposed.

On the light transmission side of the beam expander 22, a polarized light beam splitter 24 which transmits only the polarized light in a prescribed direction is disposed. On the light reflection side of the polarized light beam splitter 24, a reflection type spatial light modulator 26 is disposed. The spatial light modulator 26 is connected to the personal computer 50 through a pattern generator 52.

The pattern generator 52 generates a pattern to be displayed on the spatial light modulator 26 according to the digital data supplied from the personal computer 50. The spatial light modulator 26 modulates the introduced laser light according to the display pattern for generating a digital image (a signal beam) and a reference beam for each page. The generated signal beam and reference beam are reflected toward the polarized light beam splitter 24 and are transmitted through the polarized light beam splitter 24.

On the light transmission side of the polarized light beam splitter 24, a relay lens 28, 32 is disposed. On the light transmission side of the lens 32, a Fourier transformation lens 34 which irradiates the signal beam and the reference beam onto an optical recording medium 36 held by a stage 38 is disposed. The optical recording medium 36 is a recording medium of transmission type, and is formed in the shape of a sheet. The optical recording medium 36 may be made up of a recording material which is molded in the shape of a sheet, or may be that with which, on a transparent substrate in the shape of a sheet, a recording layer made up of a recording material is formed.

On the diffracted light emission side of the optical recording medium 36, a Fourier transformation lens 40 and a relay lens 42, 44 are disposed. On the light transmission side of the Fourier transformation lens 40, a photodetector 48 which is constituted by an imaging device, such as a CCD of CMOS sensor array, or the like, and transforms the received diffracted light into an electric signal for outputting it is disposed. The photodetector 48 is connected to the personal computer 50.

Figure 2:
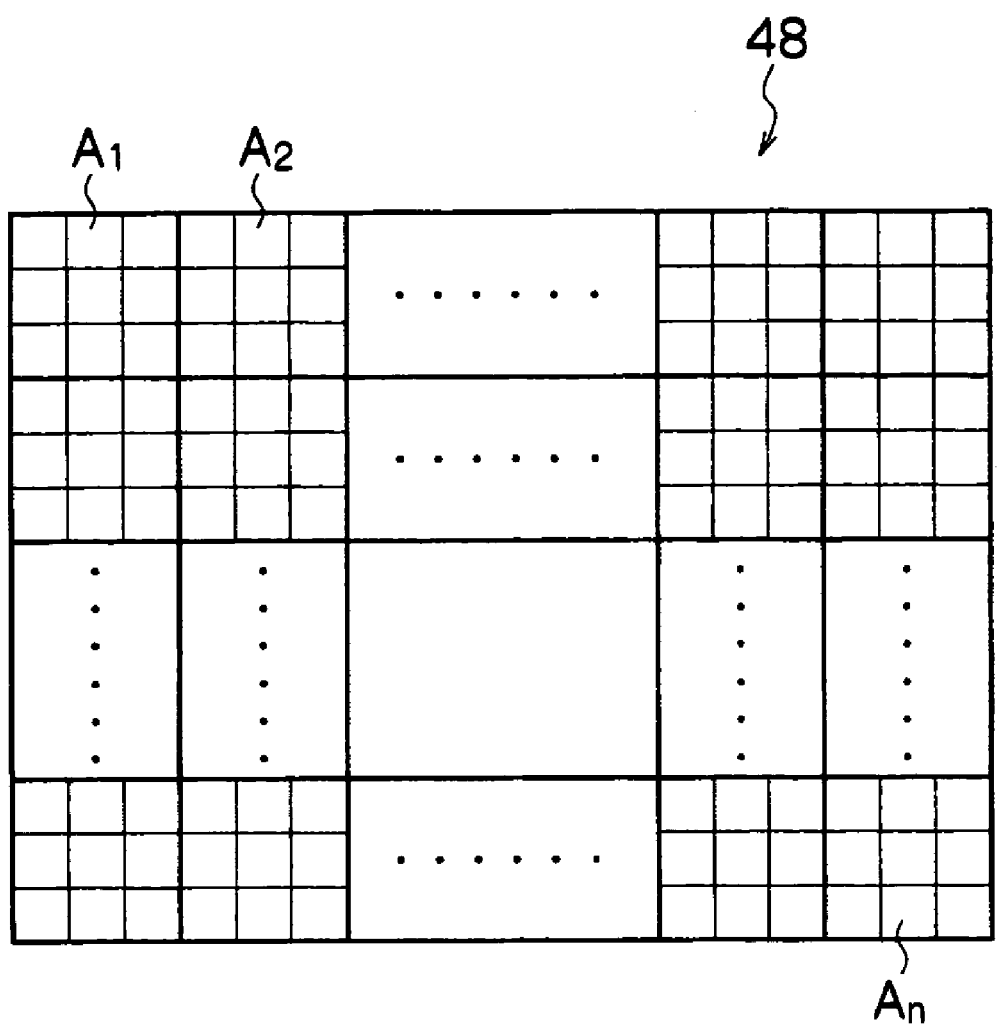
FIG. 2 is a layout drawing of light receiving units in a photodetector.

In the present exemplary embodiment, as shown in FIG. 2, the photodetector 48 is composed of light receiving units A1 to An which are made up of a plurality of pixels, respectively, and each pixel in each unit is provided in correspondence to each particular pixel in the spatial light modulator 26. Thereby, the luminance value (image data) which has been detected by each pixel in the photodetector 48 is classified as that for a particular light receiving unit, and is associated with a particular pixel in the spatial light modulator 26 before being inputted to the personal computer 50.

Figure 3:
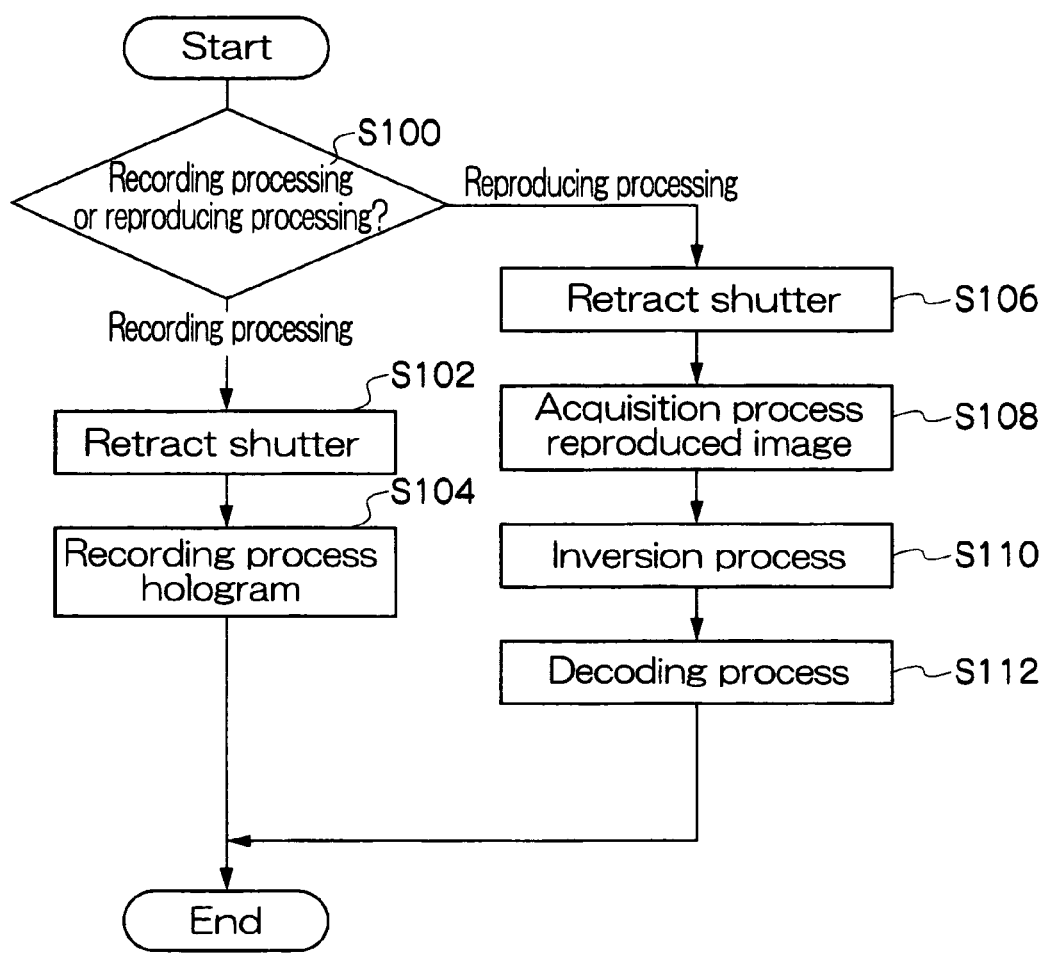
FIG. 3 is a flowchart illustrating the processing routine for recording and reproducing processing.

Next, the processing routine for recording and reproducing processing that is implemented by the personal computer 50 will be described. FIG. 3 is a flowchart illustrating the processing routine for recording and reproducing processing. Firstly, the user operates an inputting apparatus (not shown) to select whether the recording processing or the reproducing processing is to be implemented.

At step 100, it is determined whether the recording processing has been selected or the reproducing processing has been selected, and in case where the recording processing has been selected, the shutter 12 is retracted by the drive apparatus 54 at step 102 such that the laser light can pass. At the next step 104, laser light is irradiated from the light source 10, and the personal computer 50 outputs digital data at a prescribed timing for implementing the recording processing of the hologram to terminate the routine.

Herein, the recording processing of a hologram will be described.

The laser light oscillated from the light source 10 is adjusted for amount of light by the ½ wavelength plate 14 and the polarized light beam splitter 16, and is adjusted to a polarized light in a prescribed direction (in FIG. 1, a polarized light in a direction normal to the paper surface, i.e., an s polarized light) by the ½ wavelength plate 18 before being irradiated onto the mirror 20. The laser light reflected at the mirror 20 enters the beam expander 22, and is collimated by the beam expander 22 to a beam having a large diameter. The laser light collimated enters the polarized light beam splitter 24, and is reflected toward the spatial light modulator 26.

Figure 4:
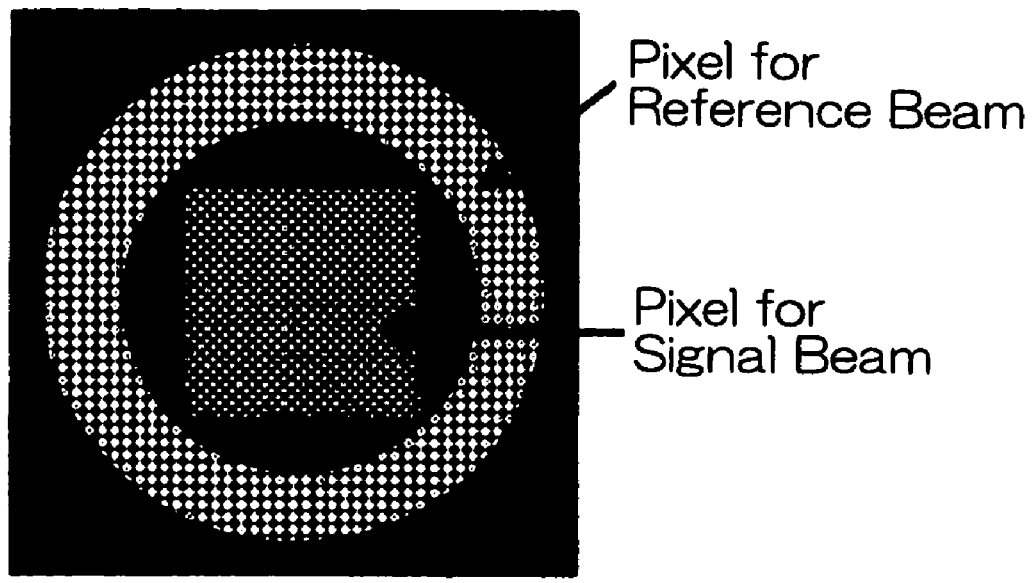
FIG. 4 is a drawing showing a displayed image on a spatial light modulator.

When digital data is inputted from the personal computer 50, a signal beam pattern is generated by the pattern generator 52 according to the digital data supplied, and is synthesized with a reference beam pattern for generating a display pattern to be displayed on the spatial light modulator 26. The spatial light modulator 26 polarization modulates the laser light according to the display pattern for generating a signal beam and a reference beam. For example, as shown in FIG. 4, the central portion of the spatial light modulator 26 is used for data display (for signal beam), and the peripheral portion is used for reference beam.

The signal beam and the reference beam generated by the spatial light modulator 26 are irradiated onto the polarized light beam splitter 24, transmitting through the polarized light beam splitter 24 to be transformed into an amplitude distribution of linearly polarized light. Thereafter, they are relayed by the lens 28, 32 before being Fourier transformed by the lens 34 to be simultaneously and coaxially irradiated onto the optical recording medium 36. Thereby, in the optical recording medium 36, the signal beam and the reference beam interfere with each other, or the signal beams interfere with each other, and the interference pattern is recorded as a hologram.

In the present exemplary embodiment, the optical recording medium 36 is disposed such that the focal point of the Fourier transformation lens 34 is located outside the optical recording medium 36. Hereinbelow, disposing the optical recording medium 36 out of the focal point in such manner is referred to as defocusing. The defocusing will be discussed later.

At step 100 in FIG. 3, in case where the reproducing processing has been selected, the shutter 12 is retracted by the drive apparatus 54 at step 106 such that the laser light can pass. At the next step 108, the acquisition processing of a reproduced image is started. In other words, laser light is irradiated from the light source 10 for implementing the acquisition processing of a reproduced image.

Herein, the acquisition processing of a reproduced image will be described .

Figure 5:
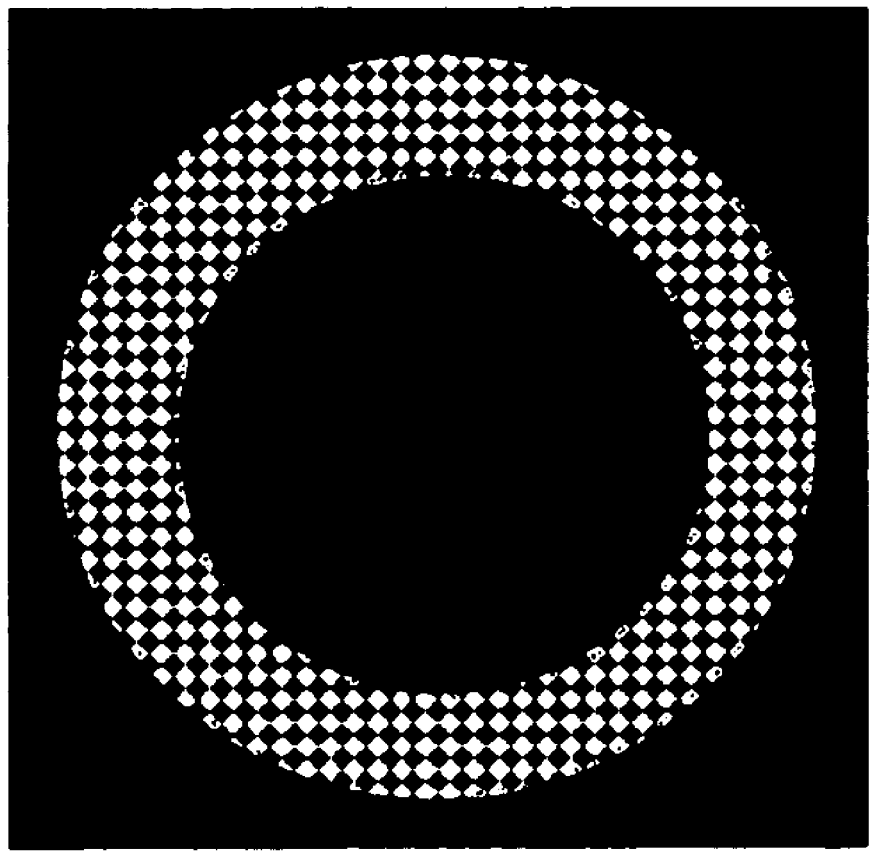
FIG. 5 is a drawing showing a displayed image on the spatial light modulator when a reproduced image is to be acquired.

As shown in FIG. 5, in the central portion of the spatial light modulator 26, a shading pattern (all, black pixels) is displayed, and in the peripheral portion of the spatial light modulator 26, the same reference beam pattern as that at the time of the recording is displayed. Thereby, only the laser light which has entered the peripheral portion of the spatial light modulator 26 is polarization modulated for generating a reference beam, which penetrates the polarized light beam splitter 24 to be transformed into an amplitude distribution, and then only the reference beam is irradiated onto the region of the optical recording medium 36 where the hologram is recorded.

The reference beam irradiated is diffracted by the hologram, and the diffracted light is emitted from the optical recording medium 36. The diffracted light emitted is inverse Fourier transformed by the lens 40 and relayed by the lens 42, 44 to enter the photodetector 48. At the focal plane of the lens 44, a reproduced image can be observed. In the present exemplary embodiment, an optical recording medium having an azopolymer is used, and defocused to record the hologram, whereby an inverted image with which brightness are inverted compared to the signal beam pattern is detected as a reproduced image. The reason why the inverted image is obtained will be discussed later.

This reproduced image is detected by the photodetector 48. The analog data detected is A/D converted by the photodetector 48, and the image data for the reproduced image is inputted to the personal computer 50 to be held in an RAM (not shown). As described above, the luminance value (image data) which has been detected by each pixel in the photodetector 48 is associated with a particular pixel in the spatial light modulator 26 before being inputted to the personal computer 50.

At step 108 in FIG. 3, when the acquisition processing of the reproduced image has been terminated, the program proceeds to the next step 110 to read out the image data for the reproduced image that is held in the RAM, and implement the inversion processing which inverts the code of the image data read out. The reproduced image is obtained as an inverted image, thus by carrying out this inversion processing, the image data according to the signal beam pattern is reproduced. And, at the next step 112, the original digital data is decoded from the inverted data to terminate the routine. Thereby, the digital data carried by the signal beam can be accurately decoded.

(Principle of Reproduction from Inverted Image)

With the coaxial hologram recording system, the signal beam and the reference beam are Fourier transformed by the same lens, thus the 0th-order component of the signal beam and the 0th-order component of the reference beam will not be superposed one upon the other in any location other than the focal point. Therefore, by making the defocusing such that the signal beam and the reference beam are focused at a point outside the recording medium, a first hologram formed by the 0th-order component of the reference beam and the high-order component of the signal beam, and a second hologram formed by the high-order component of the signal beam and the 0th-order component of the signal beam are recorded. When, at the time of reproduction, the reference beam is irradiated as the reading-out light, the high-order component of the signal beam is reproduced from the first hologram. Next, when the reproduced high-order component of the signal beam is irradiated as the reading-out light, the 0th-order component of the signal beam is reproduced from the second hologram.

In the present invention, there is no recording in the vicinity of the focal point where the 0th-order components of the signal beam and the reference beam are focused. In the present invention, with the first hologram and the second hologram, the 0th-order component and the high-order component of the signal beam can be recorded with high efficiency, which can be considered to be the cause of that the inverted image reproduced has an extremely high contrast.

The high-order component of the reference beam forms a third hologram with the 0th-order component of the signal beam, and a fourth hologram with the high-order component of the signal beam, however, the high-order component of the reference beam is extremely weak as compared to the 0th-order component, thus the intensity of the diffracted light cannot be enhanced. For example, it is assumed that the diffraction efficiency for the first hologram which is formed by the 0th-order light and the high-order light, and that for the third hologram are equal to each other. The ratio of light intensity between the 0th-order component and the high-order component of the reference beam is high, and it is assumed to be, for example, 100:1, the intensity of the diffracted light obtained from the third hologram will be as low as $1/100$ of the intensity of the light from the first hologram.

In addition, the 0th-order component of the reference beam forms a fifth hologram with the 0th-order component of the signal beam. However, because the region where both are superposed one upon the other is limited to the region in the vicinity of the focal point, the direction along the thickness of the optical recording medium cannot be effectively utilized for volume recording (the hologram formation region does not depend upon the film thickness), thus it is difficult to provide a balance between the fifth hologram and the hologram of the signal beam high-order component, which depends upon the film thickness of the optical recording medium, and as a result, it is difficult to reproduce a brightness image of high quality with the recording reproduction utilizing the fifth hologram.

Table 1 below summarizes the respective types of hologram.

TABLE 1

|  | 0th-order component of signal beam | High-order component of signal beam |
| --- | --- | --- |
| 0th-order component of reference beam | Fifth hologram - Unacceptable Formed only in the vicinity of focal point | First hologram - Acceptable By defocusing, hologram can be efficiently formed. Light intensity at the time of reproduction is high, thus first hologram contributes as main component of diffracted light. |
| High-order component of reference beam | 3rd hologram - Unacceptable High-order component of reference beam is weak, thus it is difficult to enhance diffracted light intensity. | 4th hologram - Unacceptable High-order component of reference beam is weak, thus it is difficult to enhance diffracted light intensity. |
| High-order component of signal beam | 2nd hologram - Acceptable Diffracted light from first hologram reproduces signal beam 0th-order component. | |

In the present invention, an optical recording medium having an azopolymer is used, and defocused to record the hologram, whereby an inverted image with which brightness are inverted compared to the signal beam pattern is detected as a reproduced image. Herein, the reason why an inverted image is given is that the high-order component of the signal beam that has been reproduced from the first hologram and the 0th-order component of the signal beam that has been reproduced from the second hologram interfere with each other out of phase (with a phase difference greater than $\pi/2$).

At the time of reproducing the second hologram, the high-order component of the signal beam that has been reproduced from the first hologram is used as the reading-out light (the "introduced light") for reproducing the 0th-order component of the signal beam (the "diffracted light"). As described above, these introduced light and diffracted light interfering with each other out of phase is a must for obtaining an inverted image. As a result of a vigorous examination, the present inventor et al. have found that, by using a recording material, such as an azopolymer, which generates not only a refractive index grating, but also an absorption grating for recording a hologram, the introduced light and the diffracted light will interfere with each other out of phase.

With the optical recording medium which uses an azopolymer as a recording material, an inverted image can be obtained, while, with the optical recording medium using a photopolymer which is mainly made up of, for example, a photopolymerization initiator and a polymerizable monomer, and with which the change in absorption of the photopolymerization initiator (dye) is not fixed due to diffusion in the monomer, an inverted image can not be obtained.

With the optical recording medium using an azopolymer, not only the refractive index grating is formed at the time of recording the hologram, but also there occur a structure change, an orientation change, or the like, of the recording material with light absorption, resulting in an absorption grating being formed. Contrarily to this, with the optical recording medium using the above-mentioned photopolymer, a refractive index grating is merely formed. Theoretically, the refractive index grating provides the introduced light and the diffracted light with a phase difference of $\pi/2$, and the absorption grating gives a phase difference of $\pi$. Therefore, it is considered that, with the light absorption forming an absorption grating in the optical recording medium, the phase difference is increased to over $\pi/2$.

(Recording Material Which is Capable of Forming Absorption Grating)

As the recording material capable of forming both a refractive index grating and an absorption grating, materials which cause a change in absorption under light irradiation due to the structure change, the orientation change, the decolorizing/colorizing reaction, or the like, in the dye can be used. Among these, a polymer material having an azobenzene moiety in the side chain (a so-called "azopolymer") can be exemplarily used.

With the azopolymer, the azobenzene moiety causes an orientation change under light irradiation, and both a refractive index grating and an absorption grating resulting from the orientation change can be formed. The azobenzene moiety in an amorphous azopolymer film takes a random orientation state. When a linearly polarized excitation light corresponding to the absorption band assigned to the $\pi$-$\pi^*$ transition of the azo group is irradiated onto the azopolymer film, the azobenzene moiety in the trans form is photoisomerized to the cis form with the probability which is enhanced as the degree of alignment of the transition dipole moment to the polarization direction is increased, in other words, being selectively excited. The excited cis form is isomerized back to the trans form under light or heat. Through an angle-selective trans-cis-trans isomerization cycle due to such irradiation of the polarized light, the orientation of the azobenzene is changed to a direction that is stable with respect to the excitation light, or to a direction perpendicular to the polarized light.

Because the azobenzene moiety has photoanisotropy, it exhibits birefringence and dichroism as a result of the change in orientation. By utilizing this light-induced anisotropy, both a refractive index grating and an absorption grating can be formed. The formation of a diffraction grating is based on the change in orientation of the polymer, thus it is stable over a long period of time, and the diffraction grating can be erased by irradiating a circular polarized light or heating into the isotropic phase, or it can also be repeatedly formed (rewritten).

The recording material capable of forming both a refractive index grating and an absorption grating is not limited to azopolymer. For example, the material system as disclosed in Japanese Patent Laid-Open Publication No. 2005-115361 that can form both a refractive index grating and an absorption grating on the basis of a change in orientation of the dye having an inherent birefringence, and immobilize them using the polymerization reaction; the material system as disclosed in Japanese Patent Laid-Open Publication No. 2005-309359 that can form both a refractive index grating and an absorption grating on the basis of the decoloring reaction of a decoloring dye; the material system as disclosed in Japanese Patent Laid-Open Publication No. 2005-275258 that can form both a refractive index grating and an absorption grating by using either of the coloring reaction or the decoloring reaction and the polymerization reaction in conjunction; and the material system as disclosed in Japanese Patent Laid-Open Publication No. 2005-275158 that includes a dye having a polymerizable group, and the like can be used.

Specifically, the recording materials, also including azopolymer, containing a high-molecular weight compound that is represented by the following formula (1) can be used.

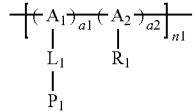

Formula [1]

In the formula (1), $L_1$ denotes a divalent linking group. $L_1$ is preferably a mere dangling bond, alkylene group (preferably having 1 to 20 carbon atoms, and examples thereof include optionally substitutable methylene, ethylene, propylene, butylene, penthylene, hexylene, octylene, decylene, undecylene, —$CH_2PhCH_2$-(p), and the like), alkenylene group (preferably having 2 to 20 carbon atoms, and examples thereof include ethynylene, propenylene, butadiinylene, and the like); alkynylene group (preferably having 2 to 20 carbon atoms, and examples thereof include ethynylene, propynylene, butadiinylene, and the like), cycloalkylene group (preferably having 3 to 20 carbon atoms, and examples thereof include 1,3-cyclopenthylene, 1,4-cyclohexylene, and the like), arylene group (preferably having 6 to 26 carbon atoms, and examples thereof include optionally substitutable 1,2-phenylene, 1,3-phenylene, 1,4-phenylene, 1,4-naphthylene, 2,6-naphthylene, and the like), heterylene group (preferably having 1 to 20 carbon atoms, and examples thereof include groups from which two hydrogen atoms are taken out to provide divalent groups of sustituted or unsubstituted pyridine, pyrimydine, triazine, piperazine, pyrrolidine, piperidine, pyrrole, imidazole, triazole, thiophene, furan, thiazole, oxazole, thiadiazole, oxadiazole, and the like), amide group, ester group, sulphoamide group, sulphonic acid ester group, ureido group, suphonyl group, suphynyl group, thioether group, ether group, imino group, carbonyl group, or a linking group which is constituted by combining any two or more of these, having 0 to 100 carbon atoms, and preferably 1 to 20 carbon atoms.

In the formula (1), $R_1$ denotes a hydrogen atom or substituent. Specific preferable examples of this substituent include alkyl group (preferably having 1 to 20 carbon atoms, and examples thereof include methyl, ethyl, n-propyl, isopropyl, n-butyl, n-penthyl, benzyl, 3-sulphopropyl, carboxymethyl, trifluoromethyl, chloromethyl, and the like), alkenyl group (preferably having 2 to 20 carbon atoms, and examples thereof include vinyl, allyl, 2-buthenyl, 1,3-butadienyl, and the like), cycloalkyl group (preferably having 3 to 20 carbon atoms, and examples thereof include cyclopenthyl, cyclohexyl, and the like), aryl group (preferably having 6 to 20 carbon atoms, and examples thereof include phenyl, 2-chlorophenyl, 4-methoxyphenyl, 3-methylphenyl, 1-naphthyl, and the like), heterocycle group (preferably having 1 to 20 carbon atoms, and examples thereof include pyridyl, pyrimydyl, thienyl, furil, thiazoryl, imidazoryl, pyrazoryl, pyrrolydino, pyperidino, morpholino, and the like), alkynyl group (preferably having 2 to 20 carbon atoms, and examples thereof include ethynyl, 2-propynyl, 1,3-butadiinyl, 2-phenylethynyl, and the like), halogen atom (for example, F, Cl, Br, and I), amino group (preferably having 0 to 20 carbon atoms, and examples thereof include amino, dimethylamino, diethylamino, dibuthylamino, anylino, and the like), cyano group, nitro group, hydroxyl group, mercapto group, carboxyl group, sulfo group, phosphonic acid group, acyl group (preferably having 1 to 20 carbon atoms, and examples thereof include acetyl, benzoyl, salicyloyl, pyvaloyl, and the like), alkoxy group (preferably having 1 to 20 carbon atoms, and examples thereof include methoxy, buthoxy, cyclohexyloxy, and the like), aryloxy group (preferably having 6 to 26 carbon atoms, and examples thereof include phenoxy, 1-naphthoxy, and the like), alkylthio group (preferably having 1 to 20 carbon atoms, and examples thereof include methylthio, ethylthio, and the like), arylthio group (preferably having 6 to 20 carbon atoms, and examples thereof include phenylthio, 4-chlorophenylthio, and the like), alkylsulphonyl group (preferably having 1 to 20 carbon atoms, and examples thereof include methanesulphonyl, butanesulphonyl, and the like), arylsulphonyl group (preferably having 6 to 20 carbon atoms, and examples thereof include benzenesulphonyl, paratoluenesulphonyl, and the like), sulphamoyl group (preferably having 0 to 20 carbon atoms, and examples thereof include sulphamoyl, N-methylsulphamoyl, N-phenylsulphamoyl, and the like), carbamoyl group (preferably having 1 to 20 carbon atoms, and examples thereof include carbamoyl, N-methylcarbamoyl, N,N-dimethylcarbamoyl, N-phenylcarbamoyl, and the like), acylamino group (preferably having 1 to 20 carbon atoms, and examples thereof include acetylamino, benzoylamino, and the like), imino group (preferably having 2 to 20 carbon atoms, and examples thereof include phthalimino, and the like), acyloxy group (preferably having 1 to 20 carbon atoms, and examples thereof include acetyloxy, benzoyloxy, and the like), alkoxycarbonyl group (preferably having 2 to 20 carbon atoms, and examples thereof include methoxycarbonyl, phenoxycarbonyl, and the like), carbamoylamino group (preferably having 1 to 20 carbon atoms, and examples thereof include carbamoylamino, N-methylcarbamoylamino, N-phenylcarbamoylamino, and the like).

Among these, more preferable examples of the substituent denoted by $R_1$ include hydrogen atom, alkyl group, aryl group, heterocycle group, halogen atom, amino group, cyano group, nitro group, hydroxyl group, carboxyl group, alkoxy group, aryloxy group, alkylsulphonyl group, arylsulphonyl group, sulphamoyl group, carbamoyl group, acylamino group, acyloxy group, and alkoxycarbonyl group. In addition, it is also preferable that $R_1$ contain one or more than one of the divalent linking groups as denoted by $L_1$.

In the formula (1), $P_1$ denotes a group containing the site for a photochromic compound other than azobenzene. However, in the present invention, a "photochromic compound other than azobenzene" means a compound which meets the requirements of [1] that no azobenzene structure is contained in that compound, and [2] that it is changed with a change in molecular structure accompanied by a change in spectrum (color) which is induced by light, and the product causes the reverse reaction under light or heat to be returned to the original substance. The requirement as given in [2] does not always include a requirement that the compound exhibit a spectrum change in the visible region.

The photochromic compound site in the present invention is preferably a compound site which can absorb light to cause a structure change. The wording "absorb light to cause a structure change" means that the 3-D structure in the molecule constituting that compound site changes between before the light being absorbed and after that, as in cis-trans isomerization, syn-anti isomerization, or the like, and/or the bond locations for the atoms constituting the molecule are changed. In addition, as the light which is absorbed by the photochromic compound site, ultraviolet light, visible light or ultrared light having a wavelength of 200 to 1000 nm is preferable, and ultraviolet light or visible light having a wavelength of 200 to 700 nm is more preferable.

The photochromic compound site in the present invention is preferably a site having anisotropy (dichroism) of the molar absorption coefficient, and is preferably a site having anisotropy (inherent birefringence) of the refractive index.

$P_1$ is preferably a site containing any one of stilbene, azomethine, stilbazorium, cinnamic acid (ester), chalcone, spyropyran, spyrooxazine, diarylethene, fulgide, fulgimide, thioindigo, and indigo, as the photochromic compound site, and is further preferably a site containing any one of spyropyran, spyrooxazine, diarylethene, fulgide, and fulgimide.

Specific examples of the photochromic compound site which $P_1$ contains are given below, but the present invention is not limited to these. The dangling bond denotes a substitution location to $L_1$. However, when an asterisked substituent R ($R_{22}$* to $R_{25}$*) is given, it means this portion has a dangling bond to $L_1$. In addition, when a particular photochromic compound site exemplified contains two or more asterisked substituents R, it means any one of the asterisked substituents R has a dangling bond to $L_1$.

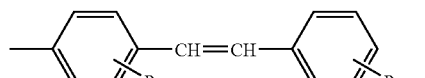
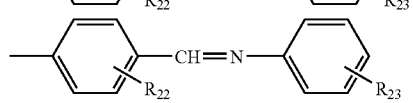
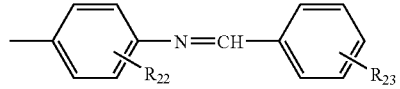
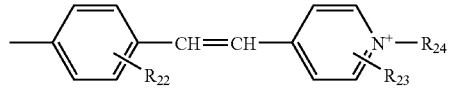
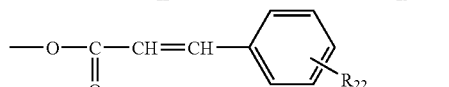
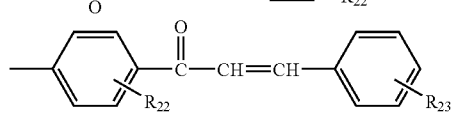

-continued

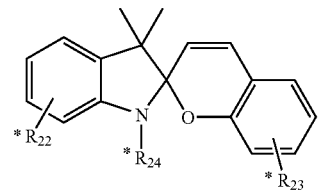
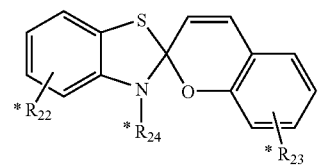
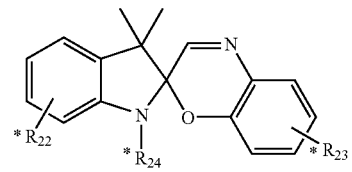
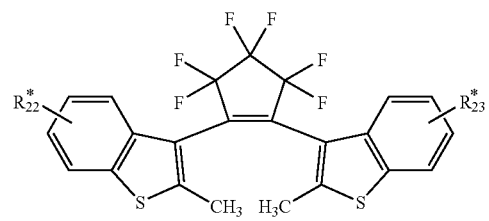
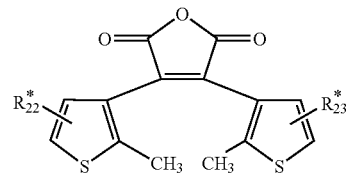
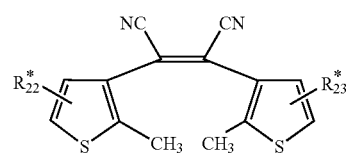
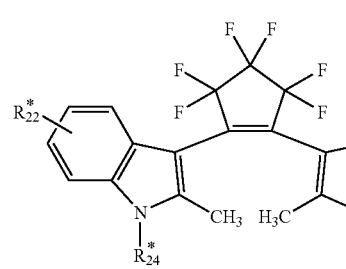
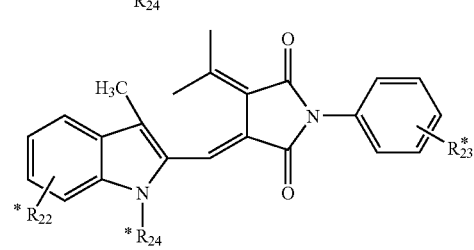

-continued

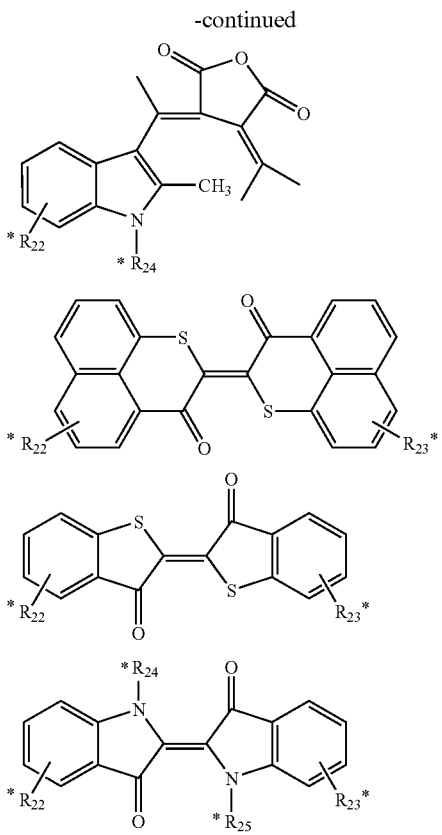

Herein, $R_{22}$ and $R_{23}$ separately denote hydrogen atom or a substituent (the examples of the preferable substituent for these are the same as those as given for $R_1$), respectively, and is optionally substitutable so long as it can be substituted. $R_{24}$ and $R_{25}$ separately denote hydrogen atom, alkyl group, alkenyl group, cycloalkyl group, aryl group, heterocycle group (the examples of the preferable substituent for these are the same as those as given for $R_1$), respectively.

In the formula (1), a1 and a2 mean a molar ratio (a1+a2=1), respectively, and a1 denotes 0.0001 to 1, and more preferably denotes 0.001 to 0.5. a2 denotes 0 to 0.9999, and more preferably 0.5 to 0.999. n1 denotes an integral number of 4 to 2000, and more preferably an integral number of 10 to 2000.

In the formula (1), A1 and A2 denote any one of the following formulae (2-1) to (2-4), respectively. In the formulae (2-1) to (2-4), the dangling bond denoted by an asterisk mark "*" means a dangling bond to $L_1$ or $R_1$ which is a side chain structure in the formula (1), and any other dangling bond means a dangling bond for constituting a main chain structure.

Formula (1-1)

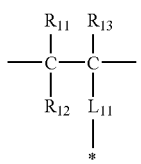

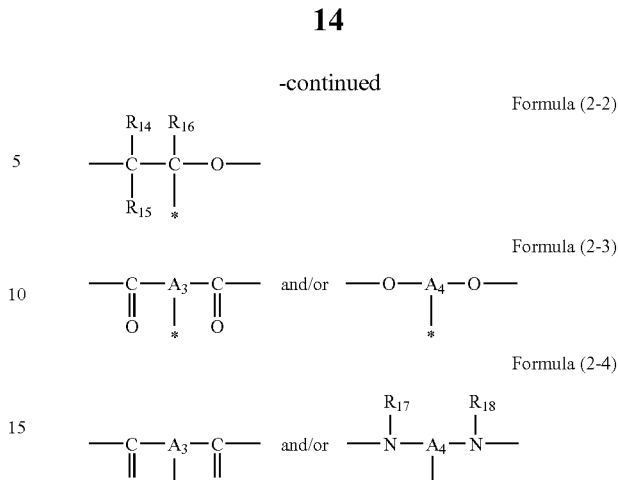

In the formula (2-1), $R_{11}$ to $R_{13}$ separately denote hydrogen atom or a substituent, respectively; more preferably denote hydrogen atom, alkyl group, aryl group, or cyano group; still more preferably denote hydrogen atom or methyl group; and further preferably denote hydrogen atom.

In the formula (2-1), $L_{11}$ denotes —O—, —OC(O)— (the dangling bond on the right side (carbon atom side) links to $L_1$ or $R_1$), —CONR$_{19}$— (the dangling bond on the right side (nitrogen atom side) links to $L_1$ or $R_1$), —COO— (the dangling bond on the right side (oxygen atom side) links to $L_1$ or $R_1$), or optionally substitutable arylene group (preferably having 6 to 26 carbon atoms, and examples thereof include optionally substitutable 1,2-phenylene, 1,3-phenylene, 1,4-phenylene, 1,4-naphthylene, 2,6-naphthylene), and $R_{19}$ denotes any one of hydrogen atom, alkyl group, alkenyl group, cycloalkyl group, aryl group, and heterocycle group (the examples of the preferable substituent for these are the same as those as given for $R_1$), and preferably hydrogen atom or alkyl group.

In the formula (2-2), $R_{14}$ to $R_{16}$ separately denote hydrogen atom or a substituent, respectively; preferably denote hydrogen atom or alkyl group; and more preferably denote hydrogen atom or methyl group.

In the formula (2-3) and (2-4), $A_3$, and $A_4$ separately denote a trivalent linking group, respectively. Preferable examples of $A_3$ and $A_4$ include the following:

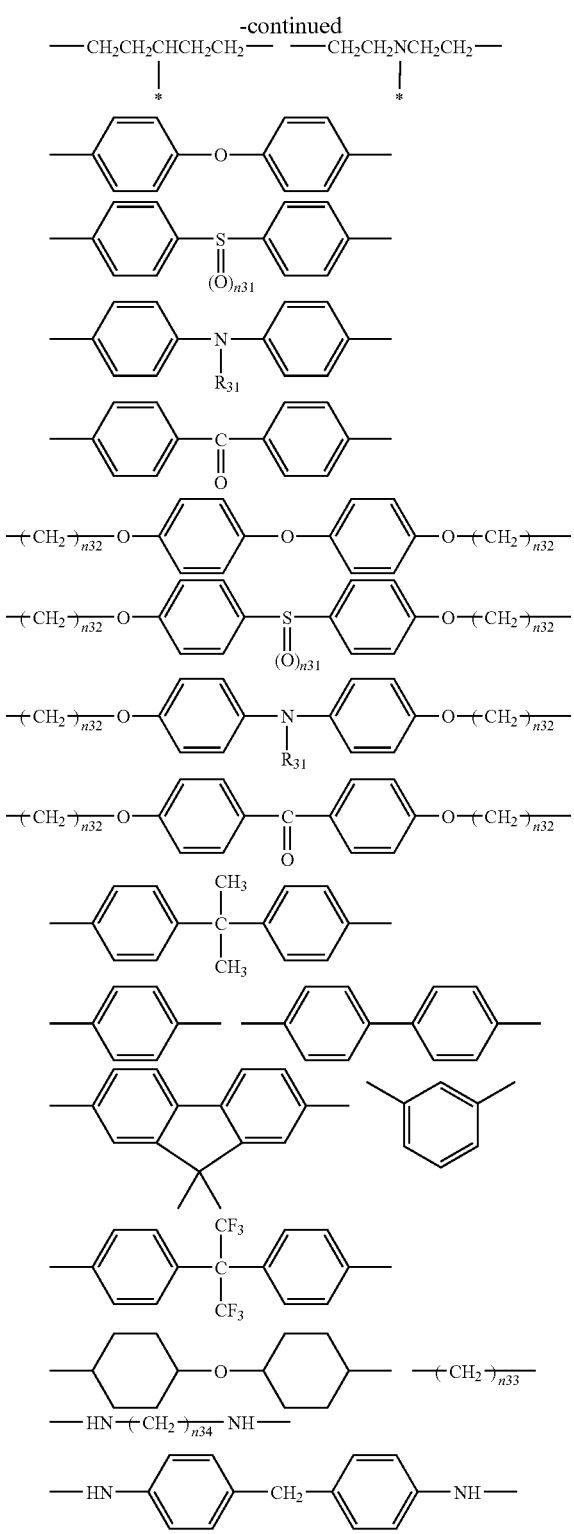

In the trivalent linking groups as mentioned above as preferable structures of $A_3$ and $A_4$, the dangling bond denoted by an asterisk mark "*" means a dangling bond to $L_1$ or $R_1$, which is a side chain structure in the formula (1), and any other dangling bond means a dangling bond for constituting the main chain structure. However, the structures which are given as divalent linking groups as preferable structures of $A_3$ and $A_4$ express the state in which a hydrogen atom as $R_1$ is linked to the dangling bond denoted by an asterisk mark "*" in $A_3$ and $A_4$. Herein, $R_{31}$ denotes methyl group or phenyl group; n31 denotes an integral number of 0 to 2; n32 denotes an integral number of 2 to 12; n33 denotes an integral number of 2 to 12; and n34 denotes an integral number of 2 to 8.

In the formula (2-4), $R_{17}$ and $R_{18}$ separately denote any one of hydrogen atom, alkyl group, alkenyl group, cycloalkyl group, heterocycle group (the examples of the preferable substituent for these are the same as those as given for $R_1$), respectively.

$A_1$ and $A_2$ are more preferably expressed by the formula (2-1) or (2-3), and further preferably expressed by the formula (2-3).

Furthermore, the high-molecular weight compound expressed by the formula (1) is more preferably that which is expressed by the following formula (3).

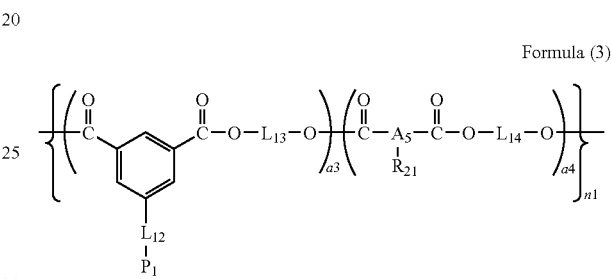

Formula (3)

In the formula (3), $P_1$ and n1 are synonymous with those in the formula (1).

In the formula (3), $R_{21}$ denotes hydrogen atom or a substituent (the examples of the preferable substituent are the same as those as given for $R_1$), and more preferably hydrogen atom, alkyl group, aryl group, heterocycle group, halogen atom, amino group, cyano group, nitro group, hydroxyl group, carboxyl group, alkoxy group, aryloxy group, alkylsulphonyl group, arylsulphonyl group, sulphamoyl group, carbamoyl group, acylamino group, acyloxy group, arylsulphonyl group, sulphamoyl group, carbamoyl group, acylamino group, acyloxy group, or alkoxycarbonyl group. In addition, it is also preferable that $R_{21}$ contain one or more than one of the divalent linking groups as mentioned by $L_1$.

$L_{12}$ to $L_{14}$ separately denote a divalent linking group, respectively, and the preferable examples thereof are the same as the examples as given for $L_{11}$. $A_5$ denotes a trivalent linking group, and the preferable examples thereof are the same as the examples as given for $A_4$.

a3 and a4 denote a molar ratio (a3+a4=1). Herein, a3 denotes 0.0001 to 1, and more preferably 0.001 to 1, and a4 denotes 0 to 0.9999, and more preferably 0 to 0.999.

The weight average molecular weight of the high-molecular weight compound as expressed by the formula (1) is preferably 1000 to 10,000,000 and more preferably 10,000 to 1,000,000.

Hereinbelow, specific examples (P-1 to P-21 and the formulae (4) and (5)) of the high-molecular weight compound expressed by the formula (1) are given, but the high-molecular weight compound expressed by the formula (1) that is contained in the hologram recording material according to an aspect of the invention is not limited to these. n in the P-1 to P-9 and the formula (4) and (5) denotes an integral number of 1 or more.

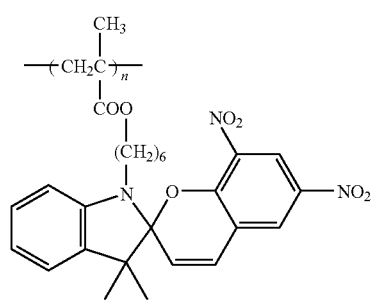
(P-1)
(P-2)
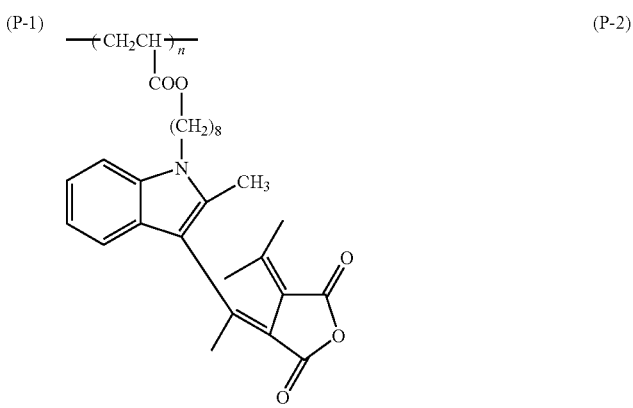
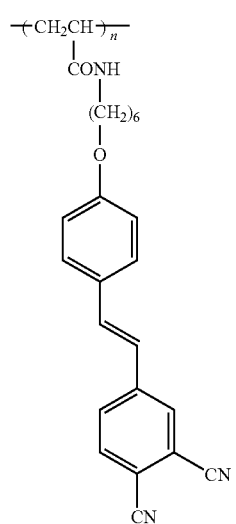
(P-3)
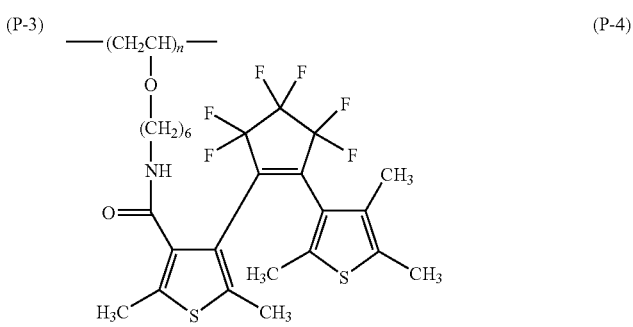
(P-4)
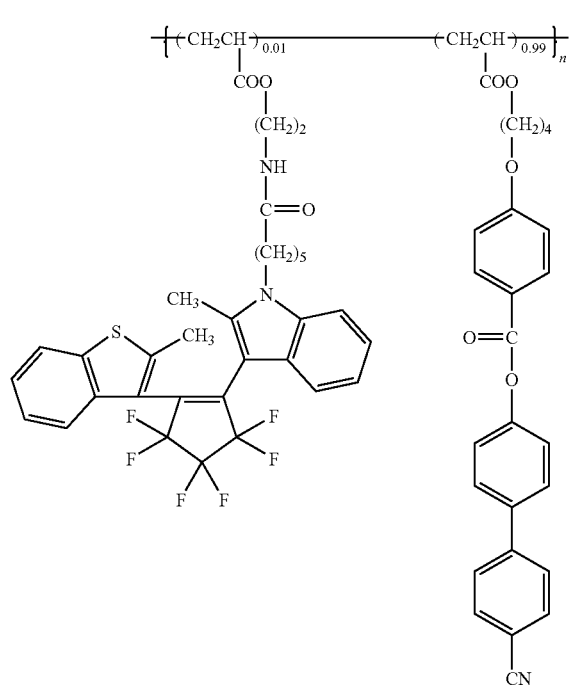
(P-5)

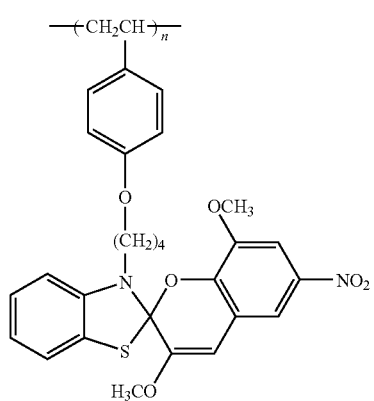 (P-6)
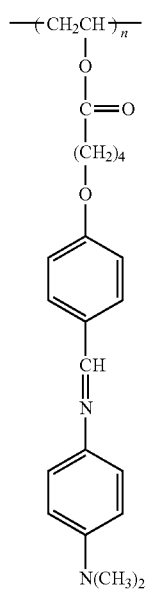 (P-7)
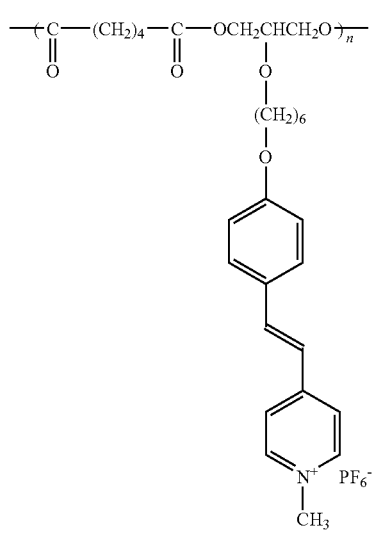 (P-8)
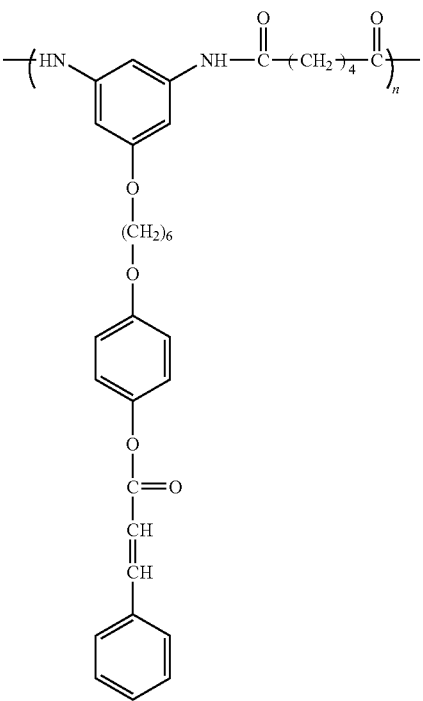 (P-9)

-continued

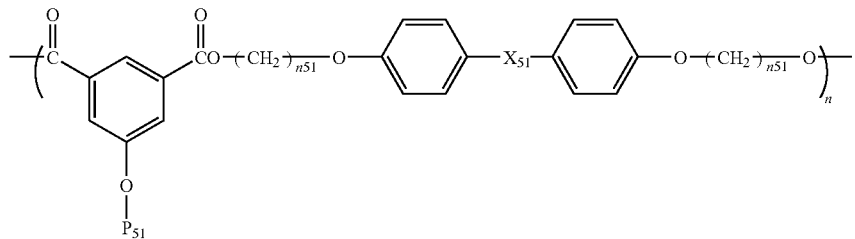

Formula (4)

However, as preferable combinations of the groups denoted by $P_{51}$ and $X_{51}$ and the integral number denoted by n51 in the formula (4), the high-molecular weight compounds P-10 to P-14 as given in the following Table 2 can be mentioned.

TABLE 2

| | $P_{51}$ | $X_{51}$ | $n_{51}$ |
|---|---|---|---|
| P-10 | —(CH₂)₂—NHCO—(CH₂)₅— [spiro indoline-chromene with Cl and NO₂] | —O— | 6 |
| P-11 | —(CH₂)₂—NHCO—(CH₂)₅— [spiro indoline-naphthoxazine] | —SO₂— | 8 |
| P-12 | —(CH₂)₆—NH— [bis-thienyl dicyanoethene] | —O— | 6 |
| P-13 | —(CH₂)₂—NHCO—(CH₂)₅— [indoline-methylene-phenylmaleimide] | —O— | 6 |
| P-14 | —(CH₂)₆—O— [bis-thioxanthone derivative] | —CO— | 10 |

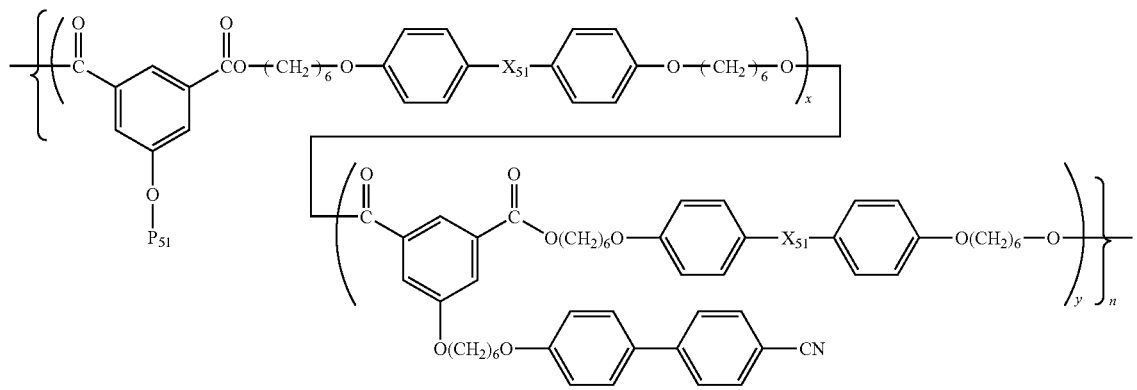

Formula (5)

However, as preferable combinations of the groups denoted by $P_{51}$ and $X_{51}$ in the formula (5), the high-molecular weight compounds P-15 to P-21 as given in the following Table 2 can be mentioned. In addition, X and Y mean a molar ratio, where the value of X/(X+Y) can be optionally selected in the range of over 0 up to 1 such that the desired characteristics, such as the diffraction efficiency, and the like, are obtained.

TABLE 3

| $P_{51}$ | | $X_{51}$ |
|---|---|---|
| P-15 —(CH$_2$)$_2$—NHCO—(CH$_2$)$_5$— | [spiropyran with NO$_2$ structure] | —SO$_2$— |
| P-16 —(CH$_2$)$_2$—OCO—(CH$_2$)$_3$— | [spirooxazine structure] | —O— |
| P-17 | [perfluorocyclopentene with indole and benzothiophene; —(CH$_2$)$_2$—NHCO—(CH$_2$)$_5$—] | —O— |
| P-18 —(CH$_2$)$_2$—NHCO—(CH$_2$)$_5$— | [indole-furanone structure] | —CO— |

TABLE 3-continued

| $P_{51}$ | $X_{51}$ |
|---|---|
| P-19 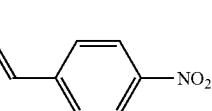 | —O— |
| P-20 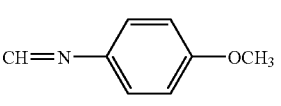 | —O— |
| P-21 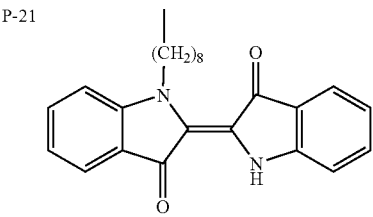 | —SO$_2$— |

Synthesis of the high-molecular weight compound expressed by the formula (1) as described above can be carried out with reference to the well-known synthesizing methods as disclosed in Japanese Patent Laid-Open Publication No. 2001-294652, Japanese Patent Laid-Open Publication No. 2000-264962, and the like.

--Non-Azobenzene Based Photochromic Compound--

Next, for the photochromic compound contained in the site denoted by $P_1$ of the high-molecular weight compound expressed by the formula (1) contained in the hologram recording material according to an aspect of the invention, the chemical structural formula, the optical characteristics, and the like will be described in more detail with reference to specific examples thereof.

The photochromism of diarylethene is a 6π-electron electrocyclic reaction with which transformation occurs only under light as with the fulgide, and the like. It is a trans-cis isomerization, and diarylethene features that the thermal stability and the repetitive durability are high. Here is a typical chemical structural formula (with two different statuses by isomerization) of diarylethene.

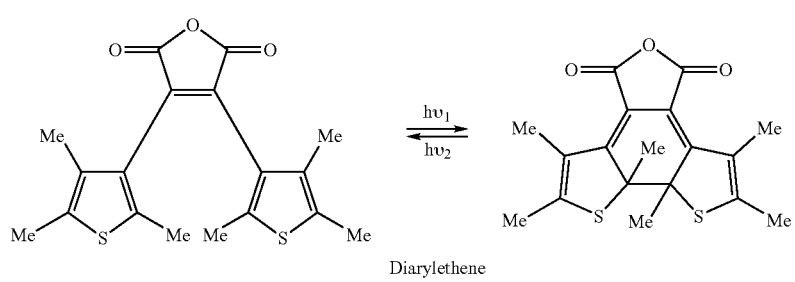
Diarylethene

Diarylethene is turned colorless upon irradiation with light near 500 nm, while it is colorized if irradiated with light near 360 nm, thus by utilizing this change in absorption, hologram recording can be performed.

Spyropyran is a photochromic compound for which the largest quantity of research reports have been made, and a part of those researches has been put to practical use, thus spyropyran is one of the most promising compounds. Here is a typical chemical structural formula (with two different statuses by isomerization) of spyropyran.

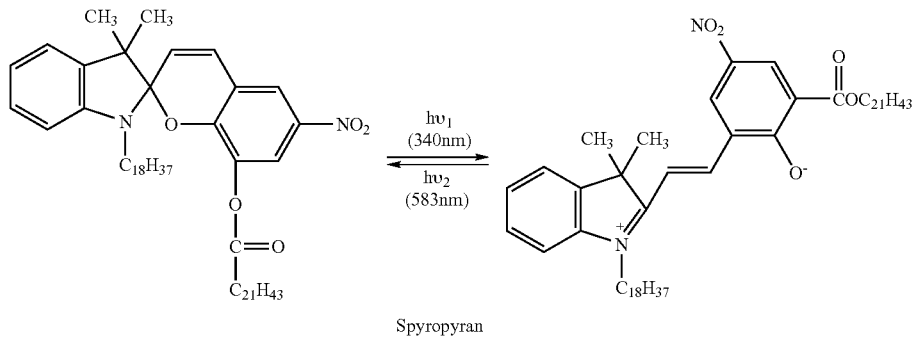

Spyropyran

Spyropyran features that its coloration is turned from colorless to a vivid color upon irradiation with ultraviolet light; the colorizing speed is high; when left in a dark place, it is slowly decolorized; and the like, and by utilizing these features, hologram recording can be performed.

Here is a typical chemical structural formula (with two different statuses by isomerization) of the xanthene-based dye, which is represented by uranine, erythrosine B, eosine Y, and the like.

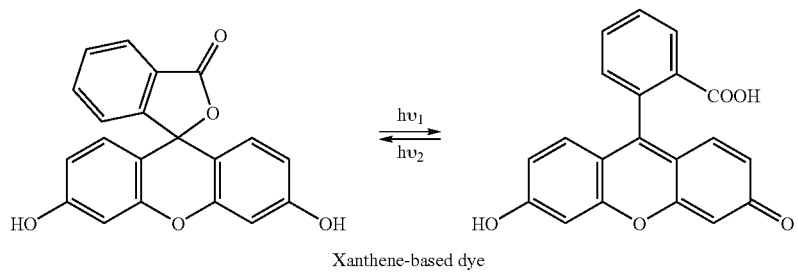

Xanthene-based dye

The xanthene-based dye is capable of reversible photoisomerization or photodiscoloration, and allows hologram recording to be performed at a relatively low light intensity.

Here is a typical chemical structural formula (with two different statuses by isomerization) of fulgide.

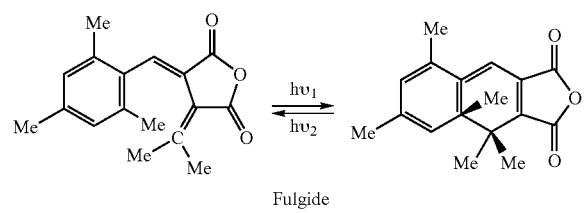

Fulgide

Fulgide is colorized upon irradiation with ultraviolet light having a wavelength of 365 nm, and is isomerized upon irradiation with green light of 515 nm or 532 nm, thus by utilizing this characteristic, hologram recording can be performed.

As described above, in the present invention, an optical recording medium capable of forming both a refractive index grating and an absorption grating under light irradiation is used, and the signal beam and the reference beam which have been Fourier transformed such that they are focused at a point outside the optical recording medium are simultaneously irradiated, whereby a diffraction grating according to the interference fringe between the signal beam and the reference beam, or the interference fringe between the signal beams, is formed in the optical recording medium for recording the signal beam as a hologram.

At the time of reproduction, by irradiating the Fourier transformed reference beam in the same manner as at the time of recording, as the reading-out light onto the optical recording medium on which the signal beam is recorded as a hologram, a diffracted light represented by an inverted image of the signal beam is generated from the diffraction grating formed in the optical recording medium. By detecting the light intensity of this diffracted light for each pixel, the image data for the inverted image is generated. And, by inversion processing the image data such that the binary code is inverted, the binary digital data carried by the signal beam can be reproduced at a high S/N.

EXAMPLES

An experiment is carried out using an apparatus having the same configuration as that of the hologram recording and reproducing apparatus as shown in FIG. 1. As the light source 10, a continuous oscillation green laser "Verdi" (with a wavelength of 532 nm) manufactured by Coherent, Inc. is used. As the reflection type spatial light modulator 26, an LCD spatial light modulator "LCoS" (with 1024 (horiz.)×768 (vert.) pixels at a pitch of 19 μm (reduced to 12.7 μm by relay lens just before Fourier transformation lens), and an image pickup area of 19.6 mm×14.6 mm) manufactured by Holoeye Photonics AG is used. As the photodetector 48, a CMOS sensor array (with 1280 (horiz.)×1024 (vert.) pixels at a pitch of 6.7 μm, and an image pickup area of 8.6 mm×6.9 mm) manufactured by Lumenera Corporation is used.

As the Fourier transformation lens 34, 40, an objective lens having a high NA (aperture ratio) (with an NA of 0.6 and a focal length of 10 mm) for use with a microscope, and the like, is used. The ratio of focal length between the relay lenses 28, 32 is 1.5 to 1, and the ratio of focal length between the relay lenses 42, 44 is 1 to 1. As the optical recording medium 36 capable of forming both a refractive index grating and an absorption grating, an azopolymer film having a thickness of 250 μm is used. The structure of the azopolymer to be used is as shown below.

Fourier transformation lens 34 for recording the Fourier transformed image as a hologram.

Figure 6:
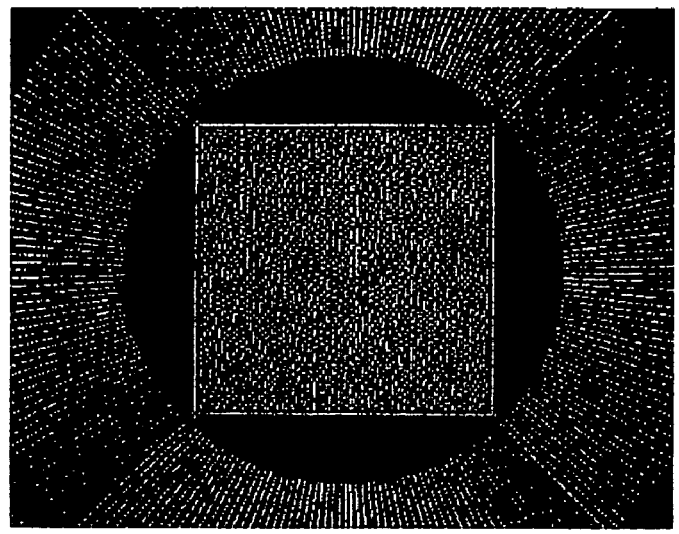
FIG. 6 is a drawing showing a signal beam pattern which is displayed on the spatial light modulator.
Figure 7:
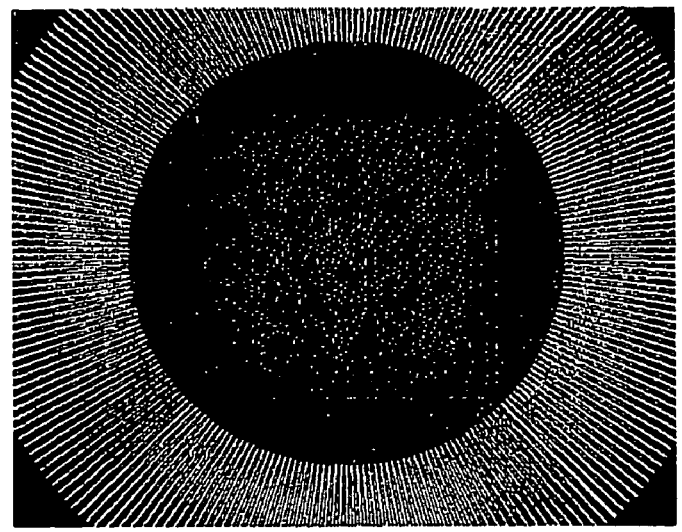
FIG. 7 is a drawing showing an inverted image which has been obtained by reproduction.

Next, by using laser light having a wavelength of 532 nm for irradiating only the reference beam pattern onto the recorded hologram, and inverse Fourier transforming the reproduced diffracted light with the Fourier transformation lens 44, a reproduced image formed at the focal plane of the Fourier transformation lens is detected by the photodetector 48. As shown in FIG. 7, an inverted image of the display pattern (FIG. 6) is reproduced.

The code of the image data for the reproduced image detected by the photodetector 48 is inverted for decoding the original digital data. At this time, the BER (bit error rate) is $4.2 \times 10^{-4}$, and the SNR is 4.71. By using the known error correction method, such as the cyclic hamming (7,4) code, or the like, the data for 329 bytes/page can be recorded and reproduced with no error.

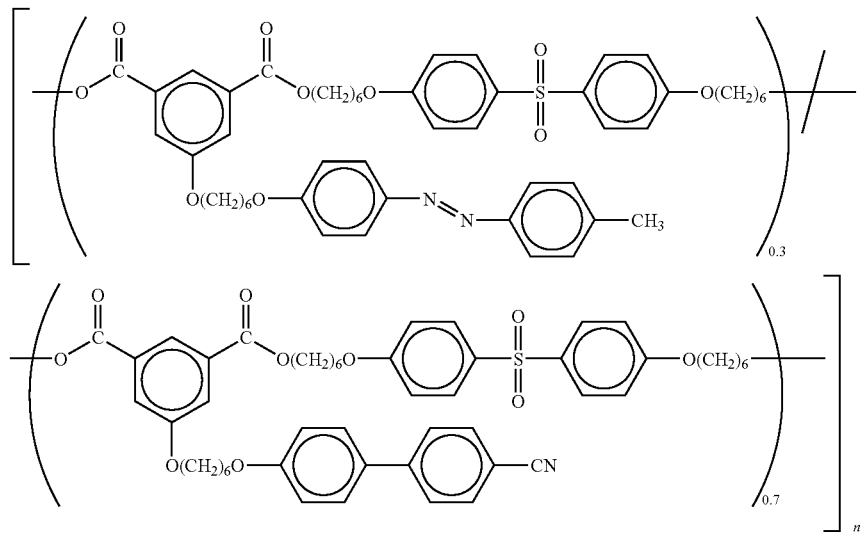

For the above-mentioned azopolymer, 5-{6-[4-(4-methylphenylazo)phenoxy]hexyloxy)isophthalic acid diethyl and 5-{6-[4-(4-cyanophenyl)phenoxy]hexyloxy)isophthalic acid diethyl are used as the side chain monomers; 6,6'-(4,4'-sulphonyldiphenylenedioxy)dihexanol is used as the main chain part monomer; and by fusion polycondensation, a polymer material having a dye (methyl azobenzene) in the side chain is synthesized. The detail of the synthesis method is given in Japanese Patent Laid-Open Publication No. 2004-59897.

Figure 8:
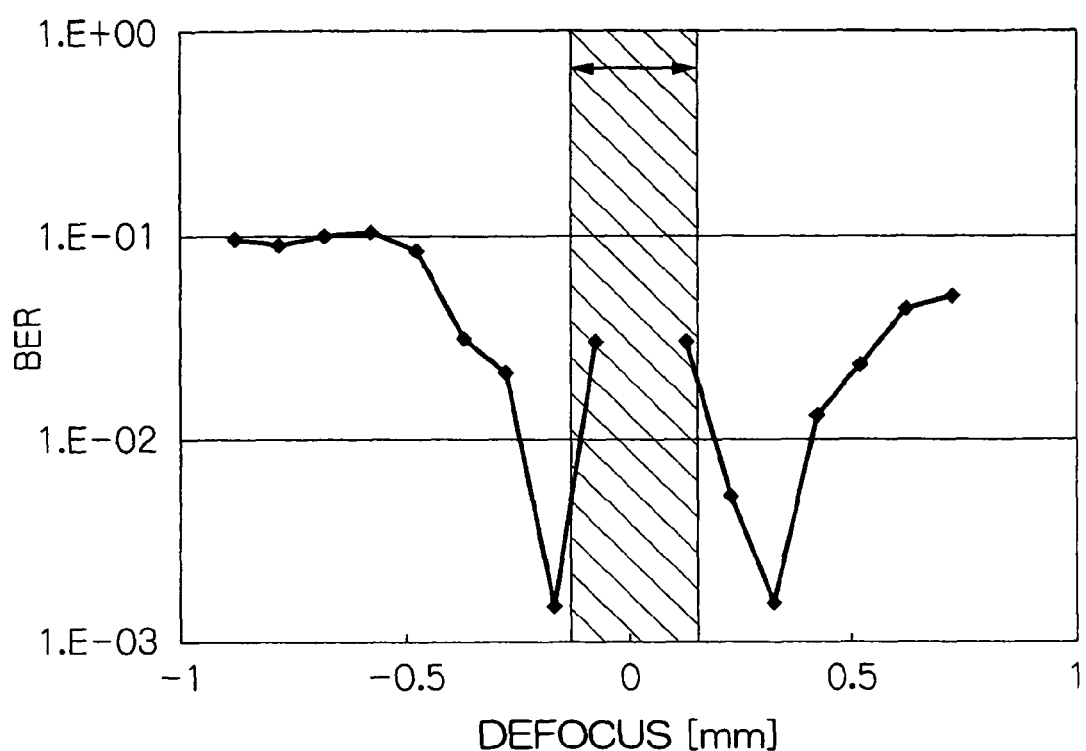
FIG. 8 is a drawing illustrating the change in BER with respect to the amount of defocus.
Figure 9:
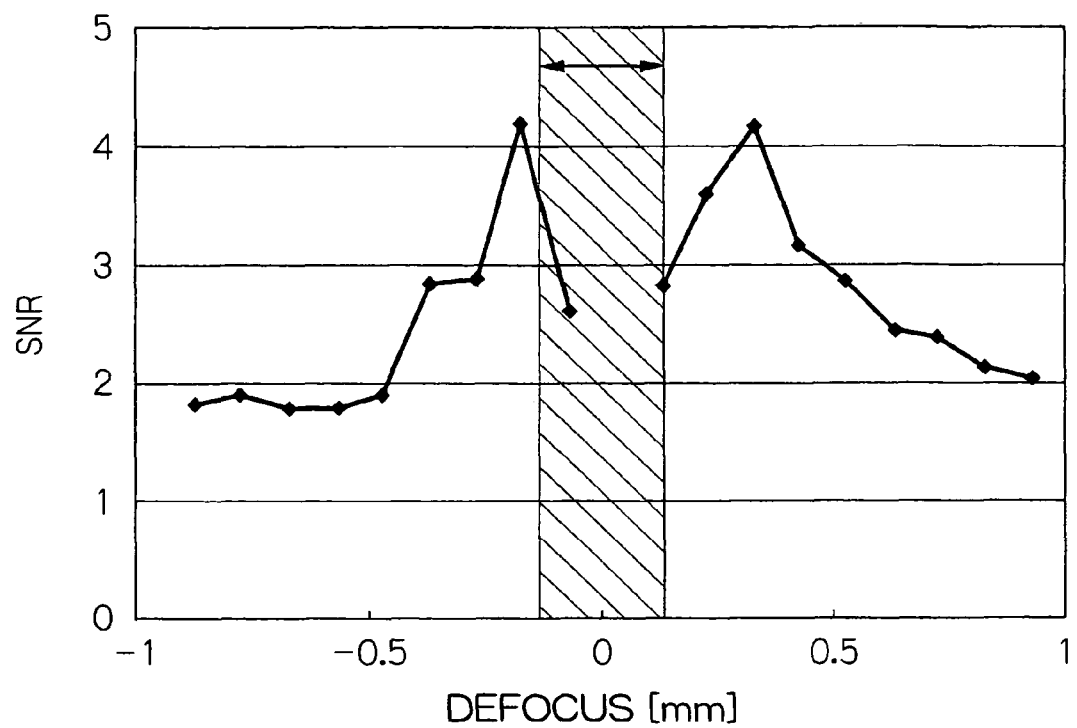
FIG. 9 is a drawing illustrating the change in S/N with respect to the amount of defocus.

By using 3×3 pixels in the spatial light modulator 26 as one pixel constituting digital data; displaying a signal beam pattern expressed by the differentiation coding method which expresses one bit with the two pixels, on the spatial light modulator 26, together with a reference beam pattern expressed in the shape of spokes (in the radial form) (FIG. 6); and irradiating laser light with a wavelength of 532 nm on this spatial light modulator 26, digital patterns of the signal beam and the reference beam are generated. The length of one side of a pixel constituting a digital pattern is 57 μm (which is for three pixels in the spatial light modulator, and is reduced to 38 μm by the relay lens just before the Fourier transformation lens). These signal beam and reference beam are irradiated onto the optical recording medium 36 through the identical Further, while the position of the optical recording medium 36 is slightly changed, hologram recording and reproducing are carried out. FIG. 8 and FIG. 9 give the results. FIG. 8 is a drawing illustrating the change in BER for the amount of defocus, and FIG. 9 is a drawing illustrating the change in S/N for the amount of defocus. The amount of defocus indicates the amount of displacement of the focal point of the Fourier transformation lens 44 from the center location of the optical recording medium 36 in the direction along the thickness thereof. In the figure, the shaded area indicates the region where the focal point is located within the optical recording medium.

As can be seen from FIG. 8 and FIG. 9, when the focal point of the Fourier transformation lens 44 is located within the optical recording medium 36, no inverted image can be obtained, resulting in the S/N being extremely lowered. When the focal point of the Fourier transformation lens 44 is located in a prescribed range (forward and backward, in two places) from the center location of the optical recording medium 36 in the direction along the thickness thereof, both BER and SNR are improved.

Herein, an exemplary amount of defocus will be discussed. As can be seen from FIG. 8 and FIG. 9, the defocusing may be made in either of the forward and backward directions.

Figure 10:
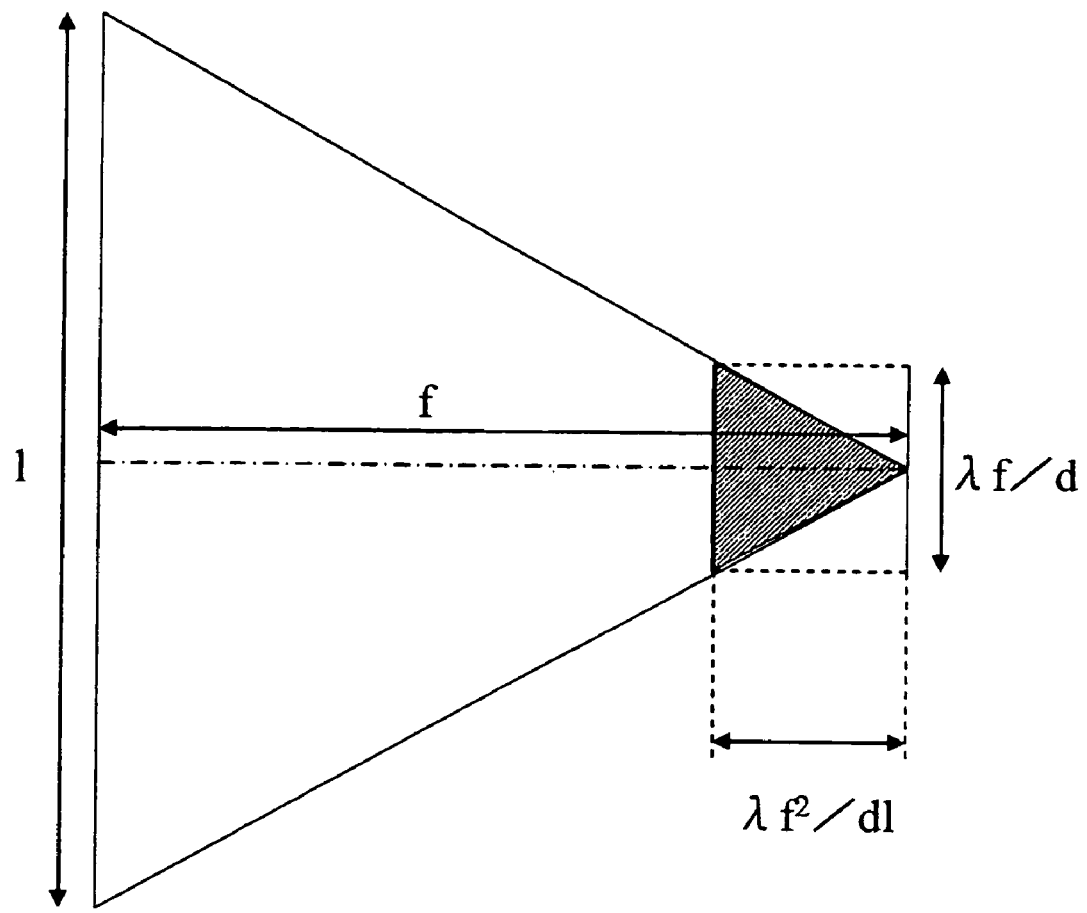
FIG. 10 is a drawing illustrating the relationship between the 0th-order component and the extent of the high-order component.

Herein, the case where the defocusing is made toward the spatial light modulator side will be discussed. FIG. 10 is a drawing illustrating the relationship between the 0th-order component and the extent of the high-order component. As shown with a solid line, the data pattern for the signal beam and the reference beam is imaged onto the focal plane of the Fourier transformation lens. The data pattern contains the 0th-order component and the high-order component, and the 0th-order component is focused at the focal plane of the Fourier transformation lens. Assuming that the size of the data pattern including the reference beam is 1; the wavelength of the signal beam and the reference beam is $\lambda$; the focal length of the Fourier transformation lens is f; and the pixel size of the spatial light modulator is d, the extent of the Fourier pattern will be $\lambda f/d$.

Therefore, the size of the 0th-order component becomes equal to the size of the extent of the Fourier pattern when the defocusing is made by $\lambda f^2/dl$ of the focal point. If the amount of defocus is increased to over $\lambda f^2/dl$, the 0th-order light irradiation onto the unnecessary region is increased, and also the 0th-order light intensity is lowered, resulting in the S/N being decreased. In addition, if the focal point is located within the optical recording layer, no inverted image can be obtained with the S/N being lowered, as previously described. Therefore, it is desirable that the defocus region be the range which contains the shaded area, in other words, the range of $\lambda f^2/dl$ of the focal point and that where the focal point is not located in the optical recording layer. The dot-dash line represents the optical axis.

Figure 11A:
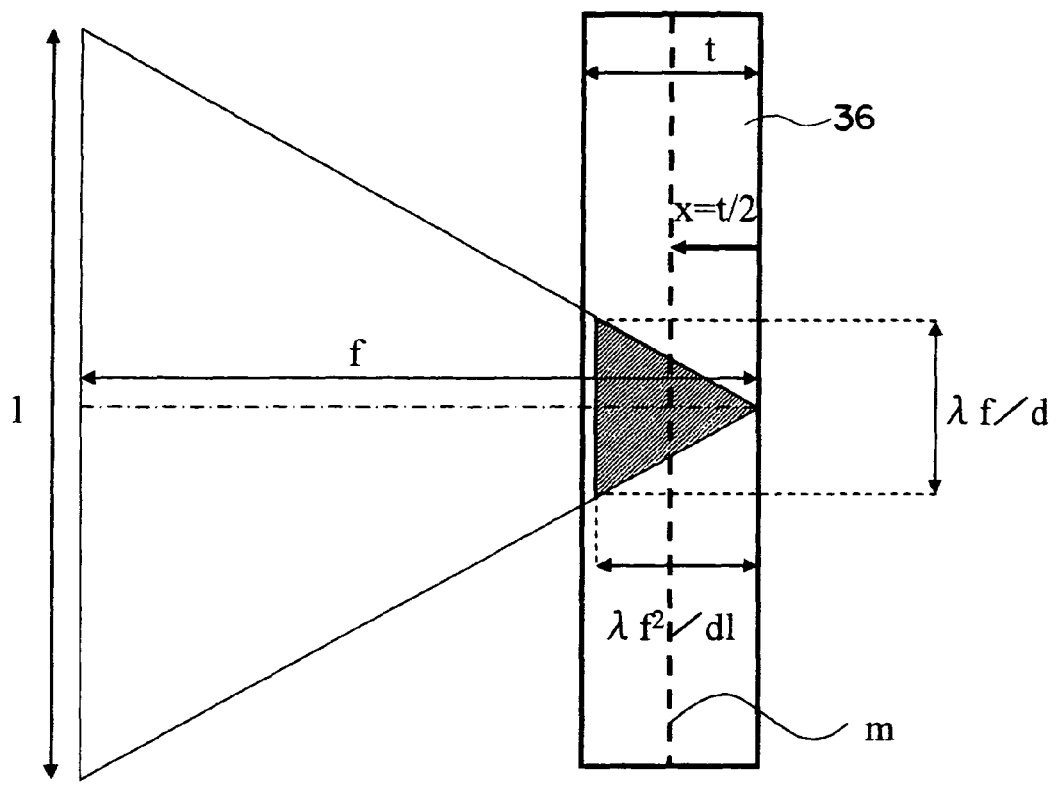
FIG. 11A is a drawing illustrating the lower limit of the range suited for defocusing.
Figure 11B:
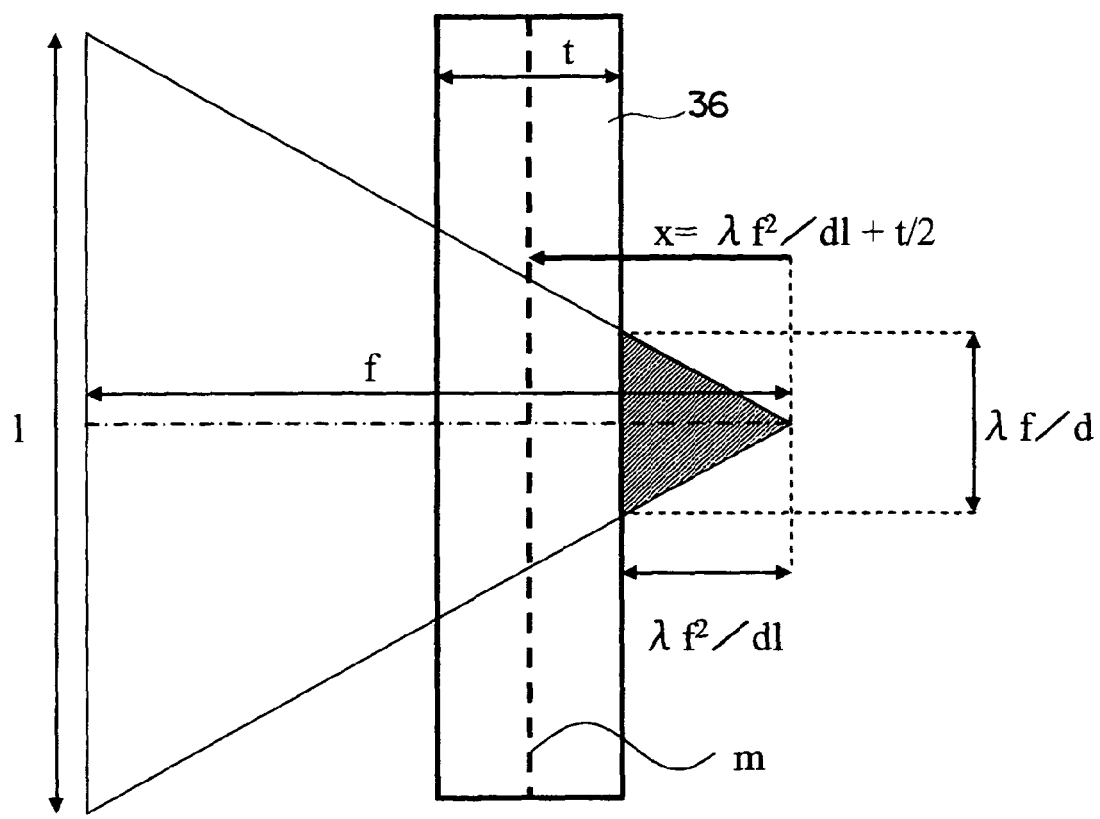
FIG. 11B is a drawing illustrating the upper limit of the range suited for defocusing.

It is assumed that the film thickness of the optical recording layer is t. In the present EXAMPLE, the optical recording medium 36 is made up of only the optical recording layer, the entire being constituted by the optical recording material, thus the thickness of the optical recording medium 36 is equivalent to the film thickness t of the optical recording layer. Assuming that the position of the optical recording medium 36 when the focal point is on the center line m thereof provides the zero-position, the lower limit of the range x suited for defocusing is t/2 as shown in FIG. 11 A, while the upper limit of the range x suited for defocusing is $\lambda f^2/dl$ plus t/2 as shown in FIG. 11 B. In other words, the range suited for defocusing is the following range:

$$t/2 \leq |x| \leq \lambda f^2/dl + t/2$$

In addition, in case where a plurality of pixels in the spatial light modulator are used as the basic unit, assuming that the size of one pixel for the digital data is p (p=3d in the present EXAMPLE), the range suited for defocusing is more preferably the following range:

$$t/2 \leq |x| \leq \lambda f^2/pl + t/2$$

The film thickness t of the optical recording layer preferably meets the following requirement in order to effectively record the necessary extent of the Fourier pattern in the region where the 0th-order component and the high-order component intersect each other.

$$t \geq \lambda f^2/dl$$

In the present EXAMPLE, the amount of defocus, x, is preferably in the range of 125 μm to 550 μm, and is more preferably in the range of 125 μm to 270 μm. This range extremely well agrees with the results of the experiments in which both BER and SNR are improved as shown in FIG. 8 and FIG. 9.

As can be seen from the above-mentioned experimental results, in the present EXAMPLE, an optical recording medium which is capable of forming a refractive index grating, and in addition forming an absorption grating accompanying a change in absorption of the optical recording material is used, and the optical recording medium is disposed in a location where the 0th-order light components of the signal beam and the reference beam are focused at a point outside the optical recording layer such that they will not be superposed one upon the other within the optical recording layer, whereby an inverted image of the signal beam pattern can be reproduced at a high SNR (low BER).

Even in case where, in place of the azopolymer, a material as given in Japanese Patent Laid-Open Publication No. 2005-115361, a material as given in Japanese Patent Laid-Open Publication No. 2005-309359, a material as given in Japanese Patent Laid-Open Publication No. 2005-275258, or a material as given in Japanese Patent Laid-Open Publication No. 2005-275158 is used, by disposing the optical recording medium in a location where focusing is made at a point outside the optical recording layer as with the azopolymer, an inverted image of the signal beam pattern can be reproduced at a high SNR.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A coaxial optical recording method, comprising:
providing an optical recording medium capable of forming both a refractive index grating and an absorption grating by light irradiation;
Fourier transforming with the same lens a signal beam that represents binary digital data with a brightness image and a reference beam such that they are focused at a point outside the optical recording medium, the signal beam and the reference beam being focused using the lens:
irradiating the Fourier transformed signal beam and reference beam simultaneously onto the optical recording medium and forming a diffraction grating at the optical recording medium according to an interference fringe between the signal beam and the reference beam, or according to an interference fringe within the signal beam itself; and
recording the signal beam as a hologram, by forming both the refractive index grating and the absorption grating in the optical recording medium.

2. The coaxial optical recording method of claim 1, wherein the optical recording medium comprises a polymer material including an azo dye in the side chain.

3. The coaxial optical recording method of claim 1, wherein: a first diffraction grating according to the interference fringe between a high-order component of the signal beam and the 0th-order component of the reference beam is formed at the optical recording medium, for recording the high-order component of the signal beam as a first hologram; and a second diffraction grating according to the interference fringe between the 0th-order component of the signal beam and the high-order component of the signal beam is formed, for recording the 0th-order component of the signal beam as a second hologram.

4. The coaxial optical recording method of claim 1, wherein, the range x suitable for defocusing is expressed by the following expression:

$$t/2 \leq |x| \leq \lambda f^2/dl+t/2$$

where, the size of the pattern of a brightness image representing the signal beam and the reference beam before being Fourier transformed is 1; the wavelength of the signal beam and the reference beam is $\lambda$; the focal length of the Fourier transformation lens is f; the pixel size for the brightness image is d; and the thickness of the optical recording medium is t.

5. An optical reproducing method, comprising:
 irradiating as a reading-out light a Fourier transformed reference beam onto the optical recording medium, at which the signal beam has been recorded as a hologram by the coaxial optical recording method according to claim 1, generating diffracted light representing an inverted image of the signal beam from the diffraction grating formed in the optical recording medium;
 detecting the light intensity of the diffracted light for each pixel, and generating image data for the inverted image;
 inversion processing the image data such that the binary code is inverted; and
 reproducing the binary digital data carried by the signal beam.

6. The optical reproducing method of claim 5, wherein the optical recording medium has a polymer material which has an azo dye in the side chain.

7. The optical reproducing method of claim 5, wherein, when the signal beam was recorded as a hologram: a first diffraction grating according to the interference fringe between a high-order component of the signal beam and the 0th-order component of the reference beam is formed at the optical recording medium, for recording the high-order component of the signal beam as a first hologram; and a second diffraction grating according to the interference fringe between the 0th-order component of the signal beam and the high-order component of the signal beam is formed, for recording the 0th-order component of the signal beam as a second hologram.

8. The optical reproducing method of claim 5, wherein, the range x suitable for defocusing is expressed by the following expression:

$$t/2 \leq |x| \leq \lambda f^2/dl+t/2$$

where, the size of the pattern of a brightness image representing the signal beam and the reference beam before being Fourier transformed is 1; the wavelength of the signal beam and the reference beam is $\lambda$; the focal length of the Fourier transformation lens is f; the pixel size for the brightness image is d; and the thickness of the optical recording medium is t.

9. An optical reproducing apparatus, comprising:
 a reading-out optical system, irradiating as a reading-out light a Fourier transformed reference beam onto the optical recording medium, at which the signal beam has been recorded as a hologram by the coaxial optical recording method according to claim 1, generating diffracted light representing an inverted image of the signal beam from the diffraction grating formed in the optical recording medium;
 a photodetector, detecting for each pixel the light intensity of the diffracted light generated by the reading-out optical system, and generating image data for the inverted image; and
 an inversion processing unit, inversion processing the image data such that the binary code is inverted, reproducing binary digital data carried by the signal beam.

10. The optical reproducing apparatus of claim 9, wherein the optical recording medium comprises a polymer material including an azo dye in the side chain.

11. The optical reproducing apparatus of claim 9, wherein, when the signal beam was recorded as a hologram: a first diffraction grating according to the interference fringe between the high-order component of the signal beam and the 0th-order component of the reference beam is formed in the optical recording medium, for recording a high-order component of the signal beam as a first hologram; and a second diffraction grating according to the interference fringe between the 0th-order component of the signal beam and the high-order component of the signal beam is formed, for recording the 0th-order component of the signal beam as a second hologram.

12. The optical reproducing apparatus of claim 9, wherein, the range x suited for defocusing is expressed by the following expression:

$$t/2 \leq |x| \leq \lambda f^2/dl+t/2$$

where, the size of the pattern of a brightness image representing the signal beam and the reference beam before being Fourier transformed is 1; the wavelength of the signal beam and the reference beam is $\lambda$; the focal length of the Fourier transformation lens is f; the pixel size for the brightness image is d; and the thickness of the optical recording medium is t.

* * * * *